US011805512B2

(12) United States Patent
Xue et al.

(10) Patent No.: US 11,805,512 B2
(45) Date of Patent: Oct. 31, 2023

(54) RECEIVING BEAM SCHEDULE FOR SIDELINK COMMUNICATIONS

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 17/485,006

(22) Filed: Sep. 24, 2021

(65) Prior Publication Data

US 2023/0095891 A1 Mar. 30, 2023

(51) Int. Cl.
*H04W 72/12* (2023.01)
*H04W 72/1263* (2023.01)
(Continued)

(52) U.S. Cl.
CPC ....... *H04W 72/1263* (2013.01); *H04L 1/1896* (2013.01); *H04W 72/046* (2013.01); *H04W 72/25* (2023.01); *H04W 72/566* (2023.01)

(58) Field of Classification Search
CPC ........... H04W 72/1263; H04W 72/046; H04W 72/566; H04L 1/1896
See application file for complete search history.

(56) References Cited

U.S. PATENT DOCUMENTS 11,050,543 B1 6/2021 Balasubramanian et al.
2019/0124490 A1 4/2019 Wu et al.
(Continued)

OTHER PUBLICATIONS

ETRI : "Discussion on NR V2X Sidelink Design", 3GPP TSG RAN WG1 Meeting #95, R1-1813095, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, 6 Pages, XP051555076, p. 2, paragraph before Proposal 5 and p. 3, Figure 2.

(Continued)

*Primary Examiner* — Min Jung
(74) *Attorney, Agent, or Firm* — Holland & Hart / Qualcomm

(57) ABSTRACT

Methods, systems, and devices for wireless communications are described. A first wireless device, such as a user equipment (UE), may be configured to communicate with one or more other wireless devices (e.g., another UE) via sidelink communications. The first wireless device may receive an indication of a schedule of resources for sidelink communications to be performed over a communication beam, the schedule indicating a set of resources corresponding to a beam configuration for the sidelink communications with a second wireless device. The first wireless device may communicate with the second wireless device via one or more sidelink channels based on configuring the communication beam using the beam configuration over the set of resources. In some examples, the indication of the schedule of resources may be received in a confirmation of the schedule established by the second wireless device or, in some examples, in a request to establish the schedule.

30 Claims, 16 Drawing Sheets

(51) Int. Cl.
*H04W 72/25* (2023.01)
*H04W 72/566* (2023.01)
*H04L 1/1867* (2023.01)
*H04W 72/044* (2023.01)

(56) References Cited

U.S. PATENT DOCUMENTS

| | | | |
|---|---|---|---|
| 2021/0314974 A1* | 10/2021 | Miao | H04L 25/0226 |
| 2022/0150000 A1* | 5/2022 | Liu | H04L 1/1864 |
| 2022/0248428 A1* | 8/2022 | Zhao | H04W 72/20 |
| 2022/0377764 A1* | 11/2022 | Choi | H04L 1/189 |
| 2023/0051721 A1* | 2/2023 | Fong | H04L 5/00 |
| 2023/0069882 A1* | 3/2023 | Zhao | H04W 72/04 |
| 2023/0080625 A1* | 3/2023 | Dutta | H04W 72/02 |

OTHER PUBLICATIONS

International Search Report and Written Opinion—PCT/US2022/040821—ISA/EPO—dated Nov. 10, 2022 (2105500WO).
Toyota Infotechnology Center: "Discussion on Beam Management for NR-V2X Sidelink in Millimeter- Wave Bands", 3GPP TSG RAN WG1 Meeting #94, R1-1809039, 3rd Generation Partnership Project, Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018, XP051516411, 7 pages, paragraph [0002], Section 2.2.

* cited by examiner

RECEIVING BEAM SCHEDULE FOR SIDELINK COMMUNICATIONS

FIELD OF TECHNOLOGY

The following relates to wireless communications, including receiving beam scheduling for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support sidelink communications, which may be direct communications between two or more UEs.

Some wireless communications systems may offer bandwidths that are available for sidelink communications. Communications in these bandwidths, however, may be susceptible to significant signal attenuation, among other issues, which may adversely affect communications that are not subject to a beamforming schedule.

SUMMARY

The described techniques relate to improved methods, systems, devices, and apparatuses that support receiving beam scheduling for sidelink communications. Generally, the described techniques provide for the configuration and indication of a schedule including at least a first set of resources corresponding to a first beam configuration for efficient sidelink communications.

Beamformed communications may mitigate signal attenuation in high frequency bandwidths. For example, a wireless device may have a plurality of antennas, which may enable the wireless device to transmit a number of different beams corresponding to different antenna configurations and to transmit in a directional manner. Such beamforming techniques may allow the wireless device to improve signal quality by decreasing interference, increasing the signal power of transmissions to an intended recipient, and increasing the likelihood of successful reception at the intended recipient, among other techniques. But, in some cases, deafness (e.g., the transmitter may fail to communicate to an intended receiver because the receiver's antenna is beamformed in a different direction causing deafness at one or both of the receiver or the transmitter) may occur between devices due to mis-aligned beams, which may hinder sidelink communications between devices.

A device, such as transmitting wireless device, a receiving device, or a base station (or some combination thereof) may configure a schedule for beamformed communications to avoid misaligned signaling. For example, a first wireless device (e.g., a first UE) and a second wireless device (e.g., a second UE) may perform a beamforming procedure to determine one or more beam configurations for sidelink communications between the first wireless device and the second wireless device. The first wireless device, the second wireless, or a base station may configure or determine a beam schedule, which may be an explicit beam schedule, including a set of resources for communicating using the one or more beam configurations. The determining device may indicate the schedule to at least some, if not both, of the other devices such that the first wireless device and the second wireless device employ the one or more beam configurations according to the schedule and thus decrease the likelihood of deafness due to misaligned communication beams.

A method for wireless communication at a first wireless device is described. The method may include receiving an indication of a schedule of resources for sidelink communications to be performed over a communication beam, the schedule of resources indicating a set of resources corresponding to a beam configuration for the sidelink communications with a second wireless device and communicating with the second wireless device via one or more sidelink channels based on configuring the communication beam using the beam configuration over the set of resources.

An apparatus for wireless communication at a first wireless device is described. The apparatus may include a processor, memory coupled with the processor, and instructions stored in the memory. The instructions may be executable by the processor to cause the apparatus to receive an indication of a schedule of resources for sidelink communications to be performed over a communication beam, the schedule of resources indicating a set of resources corresponding to a beam configuration for the sidelink communications with a second wireless device and communicate with the second wireless device via one or more sidelink channels based on configuring the communication beam using the beam configuration over the set of resources.

Another apparatus for wireless communication at a first wireless device is described. The apparatus may include means for receiving an indication of a schedule of resources for sidelink communications to be performed over a communication beam, the schedule of resources indicating a set of resources corresponding to a beam configuration for the sidelink communications with a second wireless device and means for communicating with the second wireless device via one or more sidelink channels based on configuring the communication beam using the beam configuration over the set of resources.

A non-transitory computer-readable medium storing code for wireless communication at a first wireless device is described. The code may include instructions executable by a processor to receive an indication of a schedule of resources for sidelink communications to be performed over a communication beam, the schedule of resources indicating a set of resources corresponding to a beam configuration for the sidelink communications with a second wireless device and communicate with the second wireless device via one or more sidelink channels based on configuring the communication beam using the beam configuration over the set of resources.

In some examples of the method, apparatuses, and non-transitory computer-readable medium described herein, the indication of the schedule of resources may be received in a confirmation of the schedule of resources established by the second wireless device.

In some examples of the method, apparatuses, and non-transitory computer-readable medium described herein, the indication of the schedule of resources may be received in a request to establish the schedule of resources.

In some examples of the method, apparatuses, and non-transitory computer-readable medium described herein, communicating with the second wireless device may include operations, features, means, or instructions for transmitting, via a first sidelink channel of the one or more sidelink channels, feedback to the second wireless device over at least one resource of the second set of resources using the beam configuration for the sidelink communications with the second wireless device.

In some examples of the method, apparatuses, and non-transitory computer-readable medium described herein, the indication of the schedule of resources may be received from a network device.

Some examples of the method, apparatuses, and non-transitory computer-readable medium described herein may further include operations, features, means, or instructions for performing a beamforming alignment procedure with the second wireless device and a third wireless device, where the beam configuration may be based on performing the beamforming alignment procedure and identifying a second set of resources that may have been scheduled between the first wireless device and the third wireless device based on receiving the indication of the schedule of resources, the second set of resources corresponding to a second beam configuration identified during the beamforming alignment procedure.

Some examples of the method, apparatuses, and non-transitory computer-readable medium described herein may further include operations, features, means, or instructions for performing a beamforming alignment procedure with the second wireless device, where the beam configuration may be based on performing the beamforming alignment procedure and identifying a set of beam configurations for communicating with the second wireless device, where the schedule of resources includes a first set of resources corresponding to a first beam configuration of the set of beam configurations and a second set of resources corresponding to a second beam configuration of the set of beam configurations.

In some examples of the method, apparatuses, and non-transitory computer-readable medium described herein, the first set of resources may be orthogonal to the second set of resources.

Some examples of the method, apparatuses, and non-transitory computer-readable medium described herein may further include operations, features, means, or instructions for identifying a third set of resources and a fourth set of resources of the schedule of resources, receiving, from the second wireless device over at least one resource of the first set of resources, an indication to communicate with the second wireless device over at least one resource of the third set of resources using the first beam configuration, and receiving, from the second wireless device over at least one resource of the second set of resources, an indication to communicate with the second wireless device over at least one resource of the fourth set of resources using the second beam configuration.

In some examples of the method, apparatuses, and non-transitory computer-readable medium described herein, the third set of resources and the fourth set of resources at least partially overlap.

In some examples of the method, apparatuses, and non-transitory computer-readable medium described herein, the indication to communicate with the second wireless device over the at least one resource of the third set of resources using the first beam configuration may be received using the first beam configuration or the second beam configuration.

Some examples of the method, apparatuses, and non-transitory computer-readable medium described herein may further include operations, features, means, or instructions for identifying a second set of resources of the schedule of resources, the second set of resources associated with a condition for performing the sidelink communications with the second wireless device over the second set of resources, where communicating with the second wireless device via the one or more sidelink channels may be based on identifying the second set of resources.

Some examples of the method, apparatuses, and non-transitory computer-readable medium described herein may further include operations, features, means, or instructions for receiving, from the second wireless device over at least one resource of the set of resources, an indication to communicate with the second wireless device over at least one resource of the second set of resources using the beam configuration, where communicating with the second wireless device via the one or more sidelink channels may be based on the indication to communicate with the second wireless device.

In some examples of the method, apparatuses, and non-transitory computer-readable medium described herein, the indication to communicate over at least one resource of the second set of resources may be received via a second beam configuration associated with a sidelink channel of the one or more sidelink channels.

In some examples of the method, apparatuses, and non-transitory computer-readable medium described herein, receiving the indication to communicate with the second wireless device over the at least one resource of the second set of resources may include operations, features, means, or instructions for receiving a request over the at least one resource of the set of resources, where the condition includes receiving the request.

In some examples of the method, apparatuses, and non-transitory computer-readable medium described herein, the request may be received via a feedback channel.

Some examples of the method, apparatuses, and non-transitory computer-readable medium described herein may further include operations, features, means, or instructions for transmitting, to the second wireless device, an indication that the second set of resources of the schedule of resources may be available for the sidelink communications based on receiving the indication to communicate with the second wireless device over the at least one resource of the second set of resources and receiving, from the second wireless device, a second indication to communicate with the second wireless device over the at least one resource of the second set of resources via a feedback channel based on transmitting the indication.

In some examples of the method, apparatuses, and non-transitory computer-readable medium described herein, a hybrid automatic repeat request response associated with communications between the first wireless device and the second wireless device may be received via the feedback channel or may be received via a second feedback channel.

Some examples of the method, apparatuses, and non-transitory computer-readable medium described herein may further include operations, features, means, or instructions for receiving a third indication to communicate with a third wireless device over at least one resource of a third set of resources that at least partially overlaps with the second set of resources, where the second indication includes a first priority associated with communications with the second wireless device and the third indication includes a second priority associated with communications with the third wireless device and communicating with one of the first wireless device or the second wireless device over one of a resource of the second set of resources or a resource of the third set of resources using a corresponding beam configuration based on at least one of the first priority or the second priority.

Some examples of the method, apparatuses, and non-transitory computer-readable medium described herein may further include operations, features, means, or instructions for transmitting, to the second wireless device, an indication that the second set of resources of the schedule of resources may be available for the sidelink communications, where communicating with the second wireless device via the one or more sidelink channels may be based on the availability of the second set of resources of the schedule of resources.

In some examples of the method, apparatuses, and non-transitory computer-readable medium described herein, transmitting the indication that the second set of resources of the schedule of resources may be available may include operations, features, means, or instructions for transmitting the indication via a sidelink feedback channel of the one or more sidelink channels.

Some examples of the method, apparatuses, and non-transitory computer-readable medium described herein may further include operations, features, means, or instructions for identifying the set of resources of the schedule of resources may be based on a traffic volume associated with the sidelink communications between the first wireless device and the second wireless device.

Some examples of the method, apparatuses, and non-transitory computer-readable medium described herein may further include operations, features, means, or instructions for identifying a second set of resources of the schedule of resources, the second set of resources corresponding to a second beam configuration for the sidelink communications with a third wireless device, where identifying the second set of resources may be based on receiving the indication of the schedule of resources and communicating the sidelink communications with the third wireless device via the one or more sidelink channels based on configuring the communication beam using the second beam configuration over the second set of resources.

Some examples of the method, apparatuses, and non-transitory computer-readable medium described herein may further include operations, features, means, or instructions for identifying a third set of resources of the schedule of resources based on receiving the indication of the schedule of resources, the third set of resources corresponding to a third beam configuration associated with communications at the first wireless device according to a threshold, where communicating with the second wireless device may be based at least at in part identifying the third set of resources.

A method for wireless communication at a second wireless device is described. The method may include transmitting an indication of a schedule of resources for sidelink communications to be performed over a communication beam, the schedule of resources indicating a set of resources corresponding to a beam configuration for the sidelink communications with a first wireless device and communicating with the first wireless device via one or more sidelink channels based on configuring the communication beam using the beam configuration over the set of resources.

An apparatus for wireless communication at a second wireless device is described. The apparatus may include a processor, memory coupled with the processor, and instructions stored in the memory. The instructions may be executable by the processor to cause the apparatus to transmit an indication of a schedule of resources for sidelink communications to be performed over a communication beam, the schedule of resources indicating a set of resources corresponding to a beam configuration for the sidelink communications with a first wireless device and communicate with the first wireless device via one or more sidelink channels based on configuring the communication beam using the beam configuration over the set of resources.

Another apparatus for wireless communication at a second wireless device is described. The apparatus may include means for transmitting an indication of a schedule of resources for sidelink communications to be performed over a communication beam, the schedule of resources indicating a set of resources corresponding to a beam configuration for the sidelink communications with a first wireless device and means for communicating with the first wireless device via one or more sidelink channels based on configuring the communication beam using the beam configuration over the set of resources.

A non-transitory computer-readable medium storing code for wireless communication at a second wireless device is described. The code may include instructions executable by a processor to transmit an indication of a schedule of resources for sidelink communications to be performed over a communication beam, the schedule of resources indicating a set of resources corresponding to a beam configuration for the sidelink communications with a first wireless device and communicate with the first wireless device via one or more sidelink channels based on configuring the communication beam using the beam configuration over the set of resources.

In some examples of the method, apparatuses, and non-transitory computer-readable medium described herein, the indication of the schedule of resources may be transmitted in a confirmation of the schedule of resources established by the second wireless device.

In some examples of the method, apparatuses, and non-transitory computer-readable medium described herein, the indication of the schedule of resources may be transmitted in a request to establish the schedule of resources.

In some examples of the method, apparatuses, and non-transitory computer-readable medium described herein, communicating with the first wireless device may include operations, features, means, or instructions for receiving, via a first sidelink channel of the one or more sidelink channels, feedback from the first wireless device over at least one resource of the second set of resources using the beam configuration for the sidelink communications with the first wireless device.

DETAILED DESCRIPTION

Figure 1:
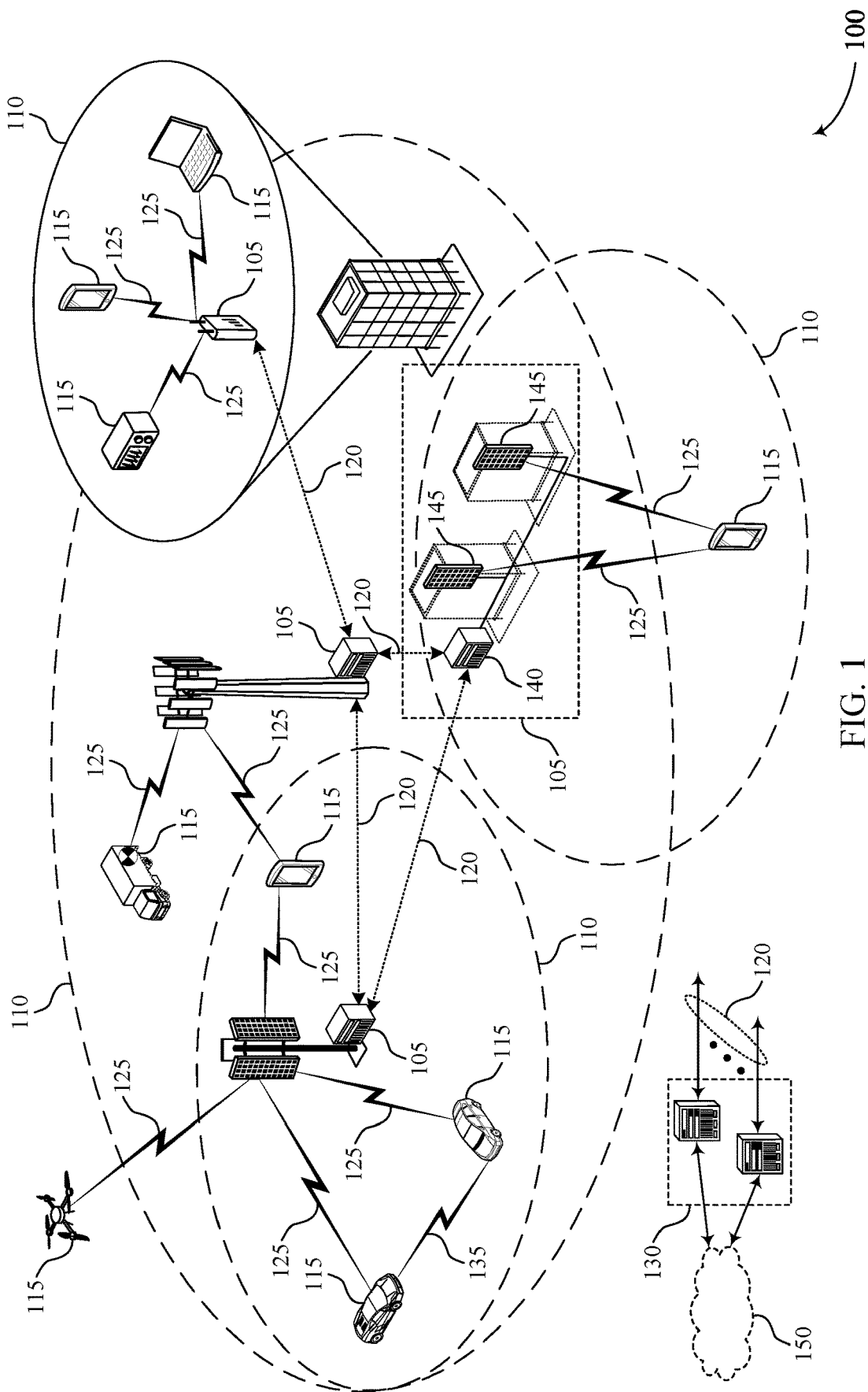
FIG. 1 illustrates an example of a wireless communications system that supports receiving beam scheduling for sidelink communications in accordance with aspects of the present disclosure.

Some wireless communications systems may include mechanisms for sidelink applications, such as vehicle-to-everything (V2X) and vehicle-to-vehicle (V2V) applications, including mechanisms for exchanging safety-related messages between vehicular UEs and exchanging messages over sub-6 GHz frequency bands, among other examples. Such wireless communications systems may include fewer or less robust mechanisms for communications over other frequency bands (e.g., 6 GHz-60 GHz), but as demand for wireless communications increases there may be motivation to communicate using the other frequency bands.

A UE configured for sidelink communications may be configured to perform broadcast communications, groupcast communications, and unicast communications with one or more other UEs. Specifically, a pair of UEs configured to communicate with each via an established sidelink connection may be configured with a sidelink interface (e.g., PC5) for sidelink signaling (e.g., radio resource control (RRC) signaling) to facilitate the exchange of information, such as UE capabilities, feedback, link maintenance, among other examples. However, the management of the sidelink interface may be subject to little oversight by network entities, especially when considered in comparison to other interface (e.g., Uu interface) signaling (e.g., RRC signaling) interface for uplink and downlink communications between a UE and a base station. For example, the other interface may be configured with additional protocols such as always-on operations and standalone reference signals where the sidelink interface, in contrast, may rely on feedback signaling (e.g., hybrid automatic request (HARQ)) discontinuous transmission mechanisms to identify link failure, among other examples. Sidelink communications may, in some examples, lack a transmission-reception direction configuration, and, consequently, may rely on re-transmissions with random inter-TX offsets to mitigate deafness, such as half-duplex deafness (e.g., deafness or missed transmissions due to transmitting at a same time or at an least partially overlapping time that a message is to be received in the half-duplex mode). The absence of transmission-reception configuration in some sidelink systems may be caused by or related to a dynamic network topology (e.g., in V2X communications systems), in addition to supporting multiple concurrent links per UE to enable peer-to-peer traffic.

Some other different wireless communications systems may include mechanisms for various sidelink applications in other examples (e.g., vertical domains), including those that may related to full-duplex procedures (e.g., procedures supporting simultaneous or overlapping transmission and reception at a device). A vertical domain may be a particular industry or group of enterprises in which similar products or services are developed, produced, and provided (e.g., for public safety or other applications). For example, mechanisms for discontinuous reception and partial sensing in Mode 2 operations (e.g., enabling out of coverage operations and autonomous resource selection) may be developed to support UEs powered by battery and inter-UE coordination may be developed to improve the reliability of Mode 2 channel access including transmit diversity protocols.

Some vertical domains have been focused on sub-6 GHz licensed band communications. However, not every vertical domain has access to the sub-6 GHz licensed band, but there may be bandwidth available in 6 GHz and 60 GHz unlicensed band for these vertical domains. As such, sidelink applications and protocols for these bands (e.g., including unlicensed bands) may be developed.

In some examples, the bandwidth available in the 6 GHz and 60 GHz unlicensed bands, for example, may be susceptible to propagation loss which may be mitigated through beamforming alignment between transmitting and receiving devices. However, in some examples, deafness may occur due to misaligned beams in addition to the half-duplex deafness discussed herein, causing challenges in other different systems using other different mechanisms for connection establishment, maintenance, and reliability.

In accordance with aspects of the present disclosure, an explicit beam schedule (e.g., an explicit receiving beam schedule) may overcome these challenges and may provide for efficient and robust sidelink communications, such as unicast communications in unlicensed frequency bands, for example by mitigating the occurrence of deafness or missed transmissions while addressing attenuation that may be relatively more common in higher frequency bands. For example, an explicit beam schedule may indicate a set of resources to a UE for transmitting or receiving using a corresponding beam configuration.

In some other different wireless communications systems, a device such as a base station may configure communication resources (e.g., time resources) for downlink and uplink communications in a time division duplexing (TDD) communications system based on the interface between the UE and the base station. For example, a base station and a UE may perform a beamforming procedure for efficient intracommunication. In some downlink communications schemes, after an initial beamforming alignment procedure, the base station may allocate a set of resources which the UE may use to receive control information (e.g., PDCCH, semi-persistent scheduling) from the base station. At each reception occasion, the UE may tune one or more receiving beams to a beam configuration determined for communications with the base station during the beamforming alignment procedure. In some examples, the base station may transmit downlink control information to the UE that may allow the UE to dynamically tune the one or more receiving beams of the UE to the appropriate beam configuration for receiving control information.

In some examples of other different systems, the UE may be configured with a receiving beam schedule including a set of committed resources for a first type of information (e.g., including downlink control information (DCI) search space, downlink semi-persistent scheduling) during which the UE is available and readily tunes one or more receiving beams to the appropriate configuration for receiving the information. In some examples, the receiving beam schedule may include a second set of resources that are conditionally committed to receiving downlink information from the base station in which the UE becomes available and will tune one or more receiving beams to a configuration dynamically configured by, for example, DCI based on receiving the DCI in one or more of the resources of the set of committed resources. In handover and multi-transmission/reception point use cases, the associated base stations may agree to a set of committed and conditionally committed resources through various communications, such as backhaul communications.

When applied to sidelink communications, these different mechanisms may lack a device (e.g., a network device such as a base station) to configure the schedule of resources and the semi-static and dynamic beam configurations, among other aspects, for the sidelink communications. For example, in the different mechanisms previously discussed, a single UE may not be configured to independently determine a receiving schedule (e.g., including resources for communicating via one or more receive beam configurations) for itself and any other UEs with which the UE may be connected for unicast communications.

In accordance with aspects of the present disclosure, a receiving UE configured for sidelink communications may be connected to another single device. However, in most cases, the receiving UE may be in communications with a plurality of entities (e.g., including other UEs, base stations, or both) and thus may partition the available reception occasions among the multiple entities to effectively communicate with each of the entities. In some examples, assistance information may be communicated (e.g., in a hand-shaking procedure) to assist in determining a schedule that most satisfies the communication needs of each connected device. In some examples, there may be multiple sources of information and thus resources may be pooled. For example, a receiving UE may dedicate a first set of resources associated with a first beam configuration to a first transmitting UE and a second set of resources associated with a second beam configuration to a second transmitting UE but may additionally dedicate a third set of resources as conditionally available to the first transmitting UE and the second transmitting UE.

In accordance with aspects of the present disclosure, to efficiently and reliably receive sidelink data, sidelink control information, sidelink feedback, other information, or a combination thereof, (e.g., physical sidelink feedback channel (PSFCH), physical sidelink control channel (PSCCH), physical sidelink shared channel (PSSCH)) a receiving beam schedule may be determined such that the receiving UE may tune one or more receiving beams to the appropriate beam configuration at the corresponding time resources (e.g., a slot, a mini-slot, and the like, sets of multiple resources) for receiving the sidelink information from one or more transmitting UE. In some examples, the beam configurations may be determined based on a beamforming configuration, and a portion of the resources of the schedule may be committed (e.g., unconditionally committed) while another portion may be conditionally committed to one or more of the transmitting UE, or another UE, or another device (e.g., committed based on receiving additional signaling satisfying a condition).

In some examples, the schedule of resources may be used by one or more UEs to negotiate and establish a connection, such as a unicast connection, or to re-configure a connection between UEs. For example, a first UE may transmit, to a second UE, a first schedule to negotiate for a finalized schedule. The first schedule may be transmitted as assistance-information to the second UE when the second UE is to finalize the schedule or may be transmitted as assistance-information to the first UE as a confirmation when the second UE is to finalize the schedule. In some examples, it may be inefficient for the first UE to commit multiple consecutive resources for receiving information such as PSSCH and PSCCH from the second UE. Such examples may include when the traffic load between the first UE and the second UE is based on bursts or is dynamic or when the first UE is experiencing a high loading level among other examples. In such cases, the schedule may include a set of resources for receiving one or more channels, such as PSSCH and PSCCH, that may be committed conditionally upon receiving signaling via a preceding occasion or channel, such as a PSFCH occasion. For example, the first UE may be available during the conditionally committed resources if the first UE receives a specific (e.g., pre-determined) waveform, such as a PSFCH waveform, in a preceding resource. In other words, the first UE may fully commit one or more occasions, such as one or more PSFCH occasions, rather than other occasions, such as PSSCH or PSCCH occasions, because a waveform, such as a PSFCH waveform, occupies fewer OFDM symbols (e.g., two) and, hence, has a lower overhead than other occasions, such as PSCCH/PSSCH occasions, and may commit resources for one or more channels, such as PSSCH or PSCCH, if applicable.

Aspects of the disclosure are initially described in the context of wireless communications systems. Aspects of the disclosure are then described in the context of various sidelink beam scheduling system examples. Aspects of the disclosure are further illustrated by and described with reference to apparatus diagrams, system diagrams, and flowcharts that relate to receiving beam scheduling for sidelink communications.

FIG. 1 illustrates an example of a wireless communications system 100 that supports receiving beam scheduling for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to any combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use any combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications via one or more communications links, such as D2D communication link 135, according to one or more beamforming techniques.

A first UE 115 may be configured to communicate with one or more other UEs 115 via a communication link 135, such as the D2D communication link 135, according to a schedule of resources, where each of the resources of the schedule may be designated as corresponding to a particular beam configuration. In some examples, the beam configuration may be based on a beamforming process performed between the first UE 115 and one or more other UEs 115. The first UE 115 may receive an indication of the schedule of resources for sidelink communications to be performed over a sidelink communication beam. In some examples, the schedule may indicate a set of resources corresponding to a beam configuration for the sidelink communications with a second UE 115. For example, the beam configuration may be based on a beamforming procedure performed between the first UE 115 and the second UE 115. The first UE 115 may communicate with the second UE 115 over the set of resources via a communication link 135, such as the D2D communication link 135, using a communication beam having the beam configuration corresponding to the set of resources. In some examples, the indication of the schedule of resources may be received in a confirmation of the schedule established and transmitted by the second UE 115, or established and transmitted by a base station 105. In some other examples, the indication of the schedule of resources may be received in a request for the first UE 115 to establish the schedule. For example, the second UE 115 or the base station 105 may request that the first UE 115 configure the schedule of resources. When the schedule of resources for configuring a receive beam at a receiving UE 115 is implemented, communications according to the schedule may experience less signal attenuation and decreased likelihood of deafness due to misaligned communication beams.

Figure 2:
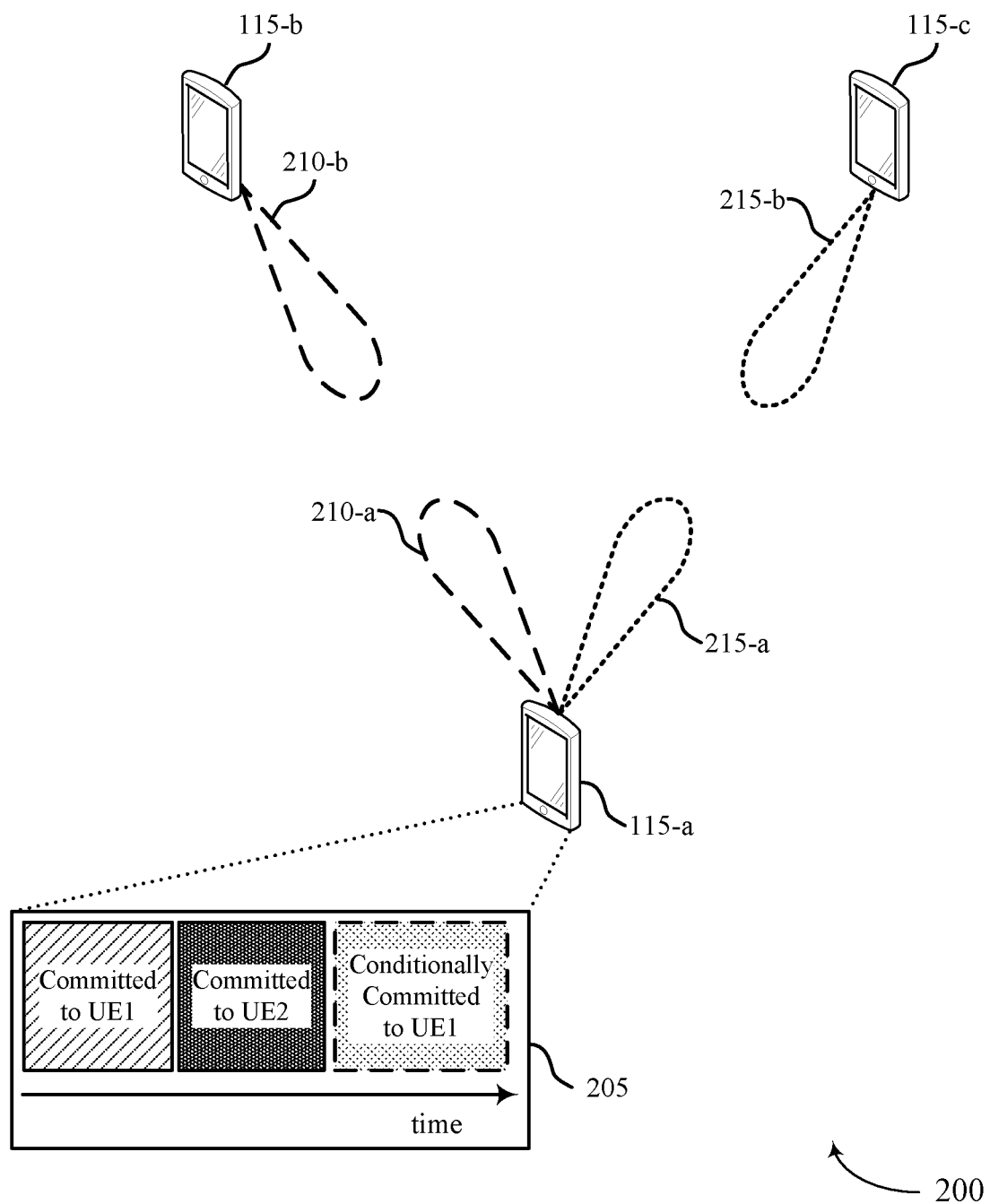
FIG. 2 illustrates an example of a wireless communications system that supports receiving beam scheduling for sidelink communications in accordance with aspects of the present disclosure.

FIG. 2 illustrates an example of a wireless communications system 200 that supports receiving beam scheduling for sidelink communications in accordance with aspects of the present disclosure. The wireless communications system 200 may implement or may be implanted by aspects of the wireless communications system 100. For example, the wireless communications system 200 may be an example of a wireless communications system that supports sidelink communications and may include a UE 115-a, a UE 115-b, and a UE 115-c. For example, the UE 115-a may perform sidelink communications with the UE 115-b, or the UE 115-c, or both and vice versa, according to the schedule of resources 205.

In some examples, the schedule of resources 205 may be configured at the UE 115-a and may include a set of resources (e.g., slots, mini-slots,) committed to receiving communications from the UE 115-b according to a first beam configuration 210, a set of resources committed to receiving communications from the UE 115-c according to a second beam configuration 215, and a set of resources conditionally committed to receiving communications from the UE 115-b according to the first beam configuration 210. As used herein, resources that are "conditionally committed" refers to resources that will be available or committed to a designated device (e.g., UE 115-b) conditioned on a dynamic signaling exchange (e.g., conditioned on a request for use of the resources being received in a proceeding committed resource). In some examples, the set of resources may additionally include a set of resources conditionally committed to receiving communications from the UE 115-c according to the second beam configuration 215. That is, each set of resources of the schedule of resources 205 may be associated with a beam configuration such that the UE 115-a may tune one or more receiving beams to the associated beam configuration during the scheduled resources. In some examples, the UE 115-a may be configured with multiple schedules of resources 205 for communicating with the UE 115-b and UE 115-c respectively.

There may be a number of mechanisms for determining or finalizing the schedule of resources 205. In one example, the UE 115-a may transmit UE assistance information to the UE 115-b or, the UE 115-c, or both, to negotiate for an agreement where the UE 115-b, the UE 115-c, or both, finalizes the schedule and communicates with the UE 115-a according to the schedule. For example, the UE 115-b may transmit using the first transmit beam configuration 210b during the corresponding resources and the UE 115-a may receive using the first receive beam configuration 210a during the corresponding resources according to the schedule of resources 205 determined by the UE 115-b, or the UE 115-c, or both. Likewise, the UE 115-c may transmit using the second transmit beam configuration 215-b during the corresponding resources and the UE 115-a may receive using the second receive beam configuration 215-a during the corresponding resources according to the schedule of resources 205 determined by the UE 115-b, or the UE 115-c, or both. In another example, the UE 115-b or, the UE 115-c may finalize the schedule of resources 205 and transmit a confirmation of the schedule of resources 205 to the UE 115-a, where the UE 115-a communicates with the UE 115-b or, the UE 115-c, or both, according to the schedule of resources 205. In another example, the UE 115-b or, the UE 115-c, or both, may transmit a request to the UE 115-a to finalize the schedule of resources 205 for sidelink communications between the UE 115-a, the UE 115-b, the UE 115-c, or any combination thereof. Based on the request to finalize the schedule of resources, the UE 115-a may finalize the schedule of resources 205 and may transmit an indication (e.g., confirmation) of the schedule of resources 205 to the UE 115-b or, the UE 115-c, or both for sidelink communications between the UE 115-a, the UE 115-b, the UE 115-c, or any combination thereof.

In some examples, the schedule of resources 205 may be dynamically configured or re-configured (e.g., based on L2/L1 signaling) according to one or more parameters, such as a traffic volume between the UE 115-a and the UE 115-b, or the UE 115-a and the UE 115-c, or both. For example, two UEs 115 may communicate via sidelink interface to reach an agreement on the schedule of resources 205 including a committed set of resources, and a conditionally committed set of resources among the other scheduling details discussed herein. The UEs 115 may use, for example, medium access control control element (MAC-CE) or sidelink control information (SCI) to determine which aspects of the schedule are to be used.

For example, when traffic volume is large (e.g., higher than a first traffic threshold) the UEs 115 may maintain the available committed set of resources as well as an available conditionally committed set of resources. In some examples, when variability in the traffic volume is within a range bounded by a set of traffic thresholds, the traffic volume may relatively predictable (e.g., as expected) and the UEs 115 may maintain the available committed set of resources. In some examples, the traffic volume may be small (e.g., lower than the first traffic threshold), and the UEs 115 may be triggered, for example, by a timer to de-activate the committed set of resources and keep the available conditionally committed set of resources. For example, the timer may start (e.g., may be activated, restart) when the traffic volume falls below the first threshold and may expire after some amount time (e.g., where the amount of time may be preconfigured or dynamically configured based on traffic conditions). The amount of time may be based on a length of time passed since first falling below the first threshold or a length of time during which the traffic volume has remained below the first threshold, among other examples. In some examples, the traffic volume may be low (e.g., lower than a second traffic threshold), and the UEs 115 may switch to communicating via the conditionally committed set of resources based on, for example, a PSFCH request (as discussed with reference to FIG. 4) before releasing a connection, such as a unicast connection. In some examples, the second traffic threshold may be the same as or different (e.g., higher or lower) than the first traffic threshold.

Additionally, or alternatively any of the examples presented may be implemented in conjunction with each other and/or may be implemented between a base station (not explicitly shown) and the UE 115-a for determining the schedule of resources 205.

Figure 3:
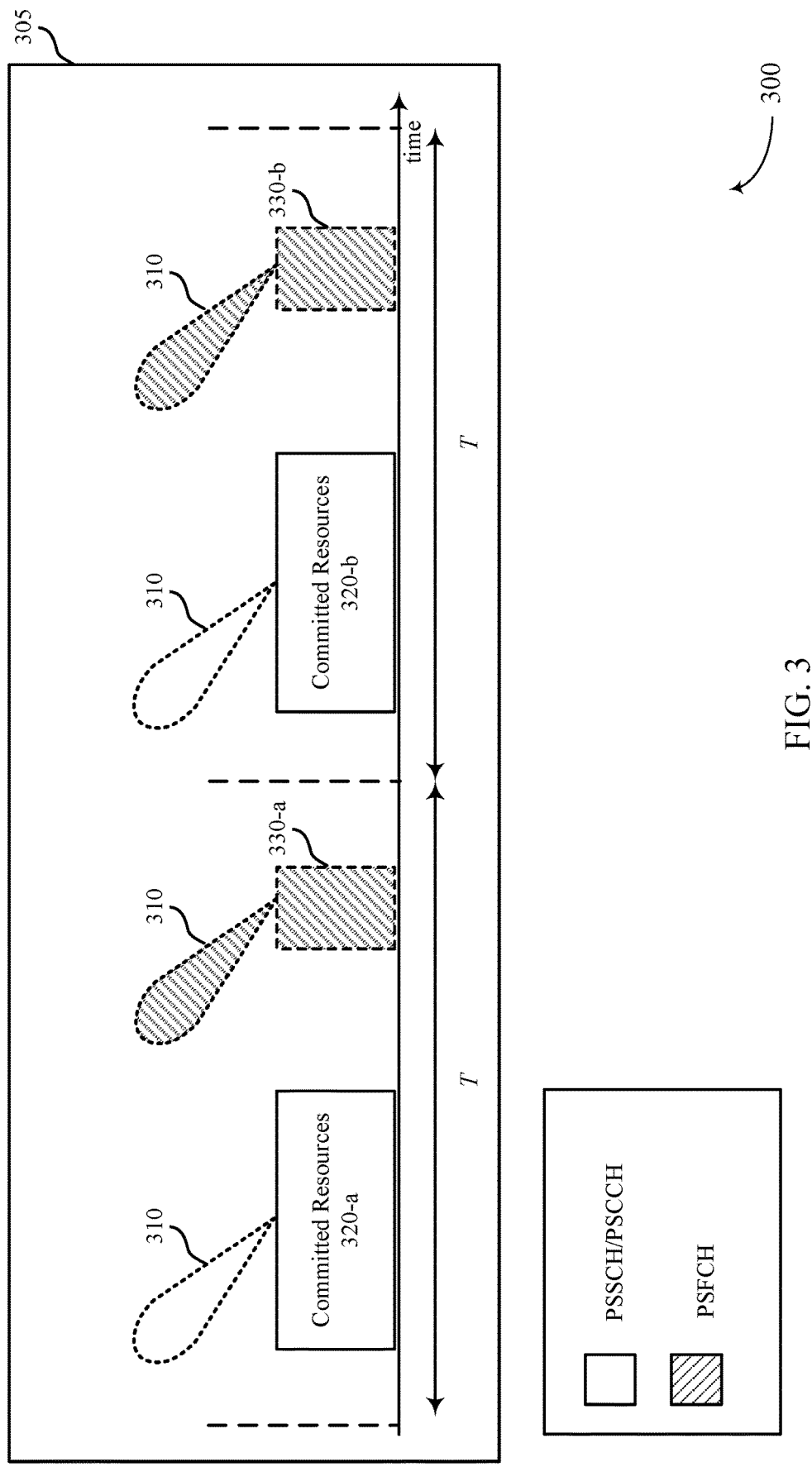
FIG. 3 illustrates an example of a sidelink beam scheduling system that supports receiving beam scheduling for sidelink communications in accordance with aspects of the present disclosure.

FIG. 3 illustrates an example of a sidelink beam scheduling system 300 that supports receiving beam scheduling for sidelink communications in accordance with aspects of the present disclosure. The sidelink beam scheduling system 300 may implement or may be implemented by aspects of the wireless communications system 100 and the wireless communications system 200. For example, the sidelink beam scheduling system 300 may be an example of a schedule of resources that supports sidelink communications according to one or more beam configurations that may include a schedule of resources 305, which may be implemented individually or in conjunction with one or more other schedules and may implemented by one or more UE 115 as described with reference to FIG. 1 or by any of the UE 115-a, the UE 115-b, or the UE 115-c, or any combination thereof, as described with reference to FIG. 2. For example, the UE 115-a may perform sidelink communications with the UE 115-b, or the UE 115-c, or both according to the schedule of resources 305.

The schedule of resources 305 may include a first set of committed resources 320 for a first UE (e.g., UE 115-a) to receive one or more channels, such as PSSCH, or PSCCH, or both, from a second UE (e.g., UE 115-b or UE 115-c) and a second set of committed resources 330 for the first UE to transmit one or more channels, such as PSFCH, to the second UE. Each of the first set of committed resources 320 and the second set of committed resources 330 may correspond to a beam configuration 310 for the first UE communicating with the second UE.

For example, one of the second UE (e.g., UE 115-b or UE 115-c), the first UE (e.g., UE 15-a), or a base station may finalize the schedule of resources 305 and may communicate the schedule to the other non-determining devices. The second UE and the first UE may tune their respective communication beams to a beam configuration for communicating with each other according to the schedule of resources 305, where the beam configuration may be determined based on a beamforming procedure. For example, based on the schedule of resources 305, the first UE may tune one or more receiving beams to the beam configuration 310 (and likewise the second UE may also tune one or more transmitting beams to the corresponding beam configuration) during first committed resources 320a of the first set of committed resources 320 and may receive one or more channels, such as PSCCH, or PSSCH, or both, over the first committed resources 320-a. Additionally, or alternatively, if the schedule of resources 305 includes the second set of committed resources 330, the first UE may also tune one or more receiving beams to the beam configuration 310 during first committed resources 330a of the second set of committed resources 330 and may transmit one or more channels, such as PSFCH, over the scheduled resources. The schedule of resources 305 may repeat according to a periodicity, T. For example, the first UE may tune one or more receiving beams to the beam configuration 310 during second committed resources 320b of the first set of committed resources 320 and may receive one or more channels, such as PSCCH, or PSSCH, or both, over the second committed resources 320-b, and if the schedule of resources 305 includes resources for transmitting one or more channels, such as PSFCH, the first UE may also tune one or more transmitting beams to the beam configuration 310 during second committed resources 330b of the second set of committed resources 330 and may transmit one or more channels, such as PSFCH, over the second committed resources 330-b. In some examples, the one or more channels, such as PSFCH, transmitted in the second set of committed resources 330 may be included in the schedule of resources 305 and may include feedback, such as HARQ feedback, for the second UE, where the HARQ feedback may indicate to the second UE whether the first UE successfully received a prior communication (e.g., PSSCH or PSCCH received over committed resources 320) from the second UE.

In some examples, the schedule of resources 305, as illustrated, includes resources for communicating with the second UE (e.g., UE 115-b) but may also include additional sets of resources for communicating with one or more other UEs (e.g., UE 115-c). For example, the schedule of resources 305 may include an additional first set of committed resources 320 (not shown) and an additional second set of committed resources 330 (not shown) for communicating with a third UE (e.g., such as UE 115-c). In some cases, the schedule of resources 305 may further include sets of committed resources for communicating with a fourth UE, a fifth UE, and so on, respectively.

Figure 4:
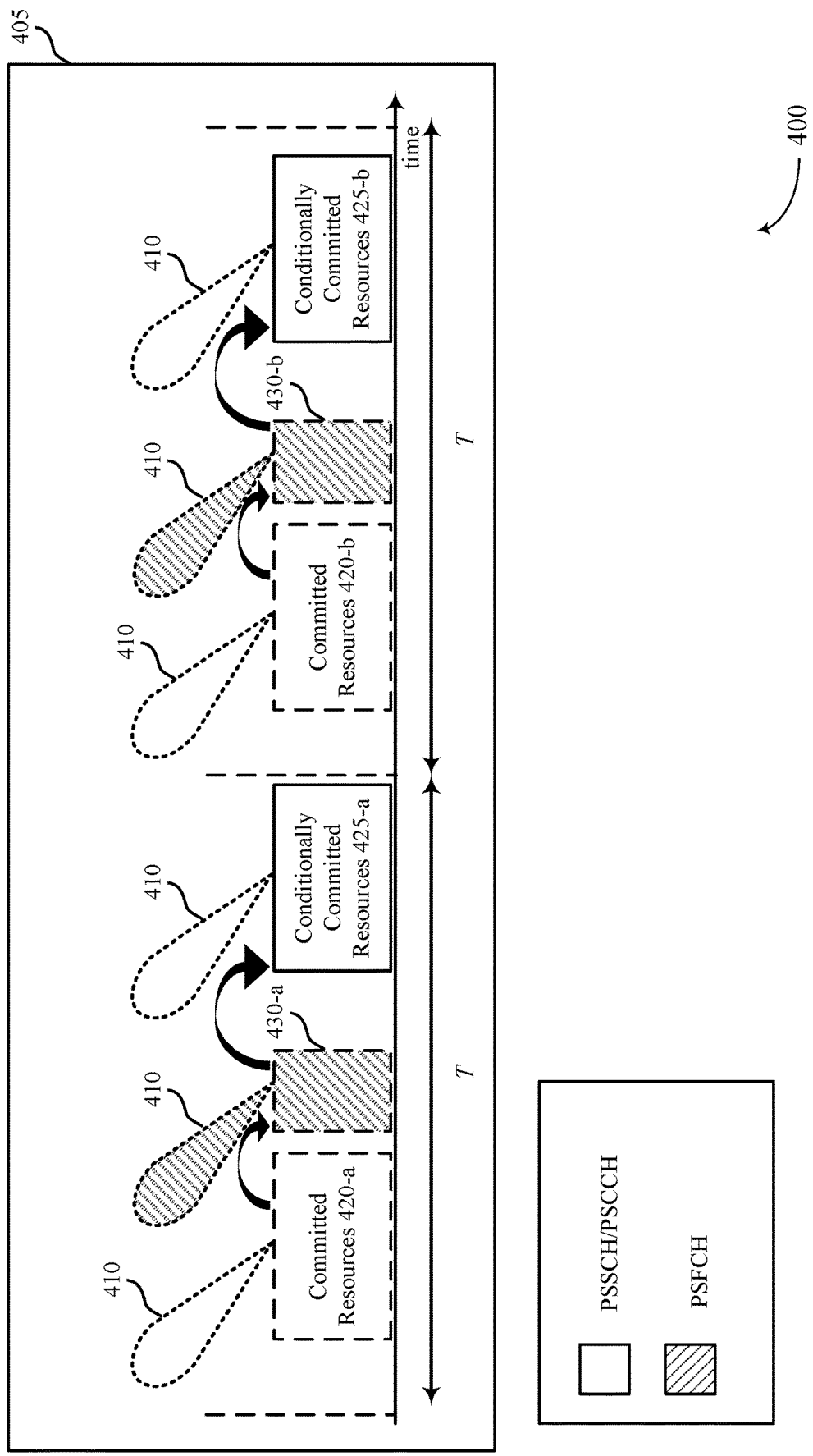
FIG. 4 illustrates an example of a sidelink beam scheduling system that supports receiving beam scheduling for sidelink communications in accordance with aspects of the present disclosure.

FIG. 4 illustrates an example of a sidelink beam scheduling system 400 that supports receiving beam scheduling for sidelink communications in accordance with aspects of the present disclosure. The sidelink beam scheduling system 400 may implement or may be implanted by aspects of the wireless communications system 100 and the wireless communications system 200. For example, the sidelink beam scheduling system 400 may be an example of a scheduling scheme that supports sidelink communications according to a beam configuration 410 and a schedule of resources 405. The schedule of resources 405 may be implemented individually or in conjunction with one or more other schedules as described herein and may repeat according to a periodicity, T. The schedule of resources 405 may be implemented by one or more UE 115 as described with reference to FIG. 1 or by any of the UE 115 described herein. For example, a first UE 115 (e.g., UE 115-a) may perform sidelink communications with a second UE (e.g., UE 115-b) according to the schedule of resources 405.

The schedule of resources 405 may include a first set of committed resources 420 for receiving one or more channels, such as PSSCH, or PSCCH, or both, a second set of committed resources 430 for receiving, or in some cases, transmitting one or more channels, such as PSFCH, and a set of conditionally committed resources 425. Each of the first set of committed resources 420, the second set of committed resources 430, and the set of conditionally committed resources 425 may correspond to a beam configuration 410 for communications between a second UE (e.g., UE 115-b) and a first UE (e.g., UE 115-a).

For example, the second UE (e.g., UE 115-b) and the first UE (e.g., UE 115-a) may tune their respective communication beams to a respective beam configuration 410 for communicating with each other according to the schedule of resources 405, where the beam configuration may be determined based on a beamforming procedure. For example, based on the schedule of resources 405, the first UE may tune one or more receiving beams to the beam configuration 410 (likewise the second UE may also tune one or more transmitting beams to the corresponding transmit beam configuration) during first committed resources 420a of the first set of committed resources 420 and may receive one or more channels, such as PSCCH, or PSSCH, or both, over the first committed resources 420-a. Additionally, or alternatively, the first UE may also tune one or more receiving beams to the beam configuration 410 during first committed resources 430a of the second set of committed resources 430 and may receive one or more channels, such as PSFCH, over the first committed resources 430-a of the second set of committed resources 430. In some other examples, the first UE may transmit one or more channels, such as PSFCH, over the first committed resources 430a of the second set of committed resources 430. The schedule of resources 405 may repeat according to a periodicity, T. For example, the first UE may again tune one or more receiving beams to the beam configuration 410 during second committed resources 420b of the first set of committed resources 420 and may receive one or more channels, such as PSCCH, or PSSCH, or both, over the second committed resources 420-b, and may also tune one or more receiving beams to the beam configuration 410 during second committed resources 430b of the second set of committed resources 430 and may receive one or more channels, such as PSFCH, over the second committed resources 430-b. In some cases, for example, cases in which the first UE may transmit one or more channels, such as PSFCH, over the first committed resources 430a of the second set of committed resources 430, the transmit one or more channels, such as PSFCH, over the second committed resources 430b of the second set of committed resources 430 according to the periodicity, T.

In some examples, the first UE may transmit or receive (e.g., during the committed resources 420-a, 430-a, 420-b, or 430b or any combination thereof) a reservation, an indication, a trigger condition, or the like, for communicating using the conditionally committed resources 425-a or 425-b. In a first example, the first UE (e.g., UE 115-a) may tune one or more receiving beams to the beam configuration 410 during the set of committed resources 430, or both, and may receive a reservation for the conditionally committed resources 425-a, or 425-b, or both. In this example, the first UE may fully commit one or more occasions (e.g., committed resources 430), such as one or more PSFCH occasions, rather than other occasions, such as PSSCH or PSCCH occasions (e.g., committed resources 420), because a waveform, such as a PSFCH waveform, occupies fewer OFDM symbols (e.g., two) and, hence, has a lower overhead than other occasions, such as PSCCH/PSSCH occasions, and may commit resources for one or more channels, such as PSSCH or PSCCH, if applicable. In a second example, the first UE (e.g., UE 115-a) may transmit an indication that the conditionally committed resources 425-a, or 425-b, or both are available where the indication is transmitted during the set of committed resources 430. More specifically, the first UE may indicate, without or independent of receiving a request from the second UE or PSSCH or PSCCH (e.g., on committed resources 420), that a conditionally committed slot or slots (e.g., conditionally committed resources 425-a) is available towards the second UE via sending a PSFCH (e.g., on committed resources 430). Accordingly, low-latency transmission from the second UE to the first UE may be improved because the second UE may not send an initial request. In a third example, the first UE may tune one or more receiving beams to the beam configuration 410 during the set of committed resources 420 and may transmit, during the committed resources 430, an indication that the conditionally committed resources 425-a, or 425-b, or both are available based on receiving information (e.g., via PSSCH, or PSCCH, or both) during the committed resources 420. According to the third example, the indication may be one or more control information bits in the information (e.g., via PSFCH or the like) transmitted during the set of committed resources 430. In this example, as illustrated in FIG. 4, the committed resources 420a may be used by the second UE to send a request to the first UE for the conditionally committed resources 425-a to be made available for communication between the first UE and the second UE. The first UE may transmit a specific PSFCH on committed resources 430a to the UE to indicate that a conditionally committed slot or slots (e.g., conditionally committed resources 425-a) is available towards the second UE. Based on the second UE receiving the PSFCH from the first UE, the second UE may proceed with transmitting in the conditionally committed slot or set of slots (e.g., on conditionally committed resources 425-a). In some examples, the specific PSFCH may be carried independently from a HARQ response or may be carried together with a HARQ response using multi-bit PSFCH based on index modulation. In some examples, the schedule of resources 405 (or any of the schedules of resources described herein) may indicate that the first set of committed resources 420 may be used specifically for one or more channels, such as PSCCH, rather than one or more other channels, such as PSCCH and PSSCH. In such examples, the conditionally committed resources 425 may be utilized if the first UE receives an indication, such as a request, in a channel, such as the PSCCH over the set of committed resources 430.

According to the first example or the second example, the schedule of resources 405 may include the second set of committed resources 430 but may not include the first set of committed resources 420. In such cases, the first UE (e.g., UE 115-a) may communicate during one or more of the conditionally committed resources 425 if a trigger, an indication, or a reservation is received or transmitted during one or more resources of the second set of committed resources 430. In such cases, resources may be conserved as the first UE may commit two resources for receiving or transmitting one or more channels, such as PSFCH, to each instance of the second set of committed resources 430 rather than committing full sets of resources for receiving one or more channels, such as PSSCH or PSCCH, to each instance of the first set of committed resources 420. Thus, the first UE may communicate during the conditionally committed resources 425 when indicated via PSFCH.

According to the second example, the first UE (e.g., UE 115-a) may indicate to a second UE (e.g., UE 115-a), independently from (e.g., without) receiving an indication, a reservation, or a trigger from the second UE, that one or more instances of the set of conditionally committed resources 425 is available. In some cases, the first UE may transmit one or more channels, such as PSFCH, over the committed resources 430 to the second UE to indicate the available resources which may decrease the latency of transmissions from the second UE.

In some examples, the second set of committed resources 430 of the schedule of resources 405 may be used for transmitting feedback (e.g., PSFCH) during the second set of committed resources 430 based on a communications procedure between the first UE (e.g., UE 115-a) and a third UE (e.g., UE 115-c) when the second UE (e.g., UE 115-b) and the third UE share a same beam configuration.

According to the third example, the set of conditionally committed resources may be utilized based on a handshaking procedure performed between the second UE (e.g., UE 115-b) and the first UE (e.g., UE 115-a). For example, the second UE may transmit, during an occurrence of the first set of committed resources 420, a reservation, a trigger, or an indication for communicating during one or more resources of the set of conditionally committed resources 425, but may transmit during one or more resources of the set of conditionally committed resources 425 if the second UE receives sidelink feedback signaling (e.g., PSFCH) from the first UE over the set of committed resources 430 in response to the reservation, the trigger, or the indication. In some examples, the channel, such as PSFCH, may be independent from a response, such as a HARQ response, or may be signaled with a response, such as a HARQ response, using a channel, such as using a multi-bit PSFCH (e.g., based on index modulation).

Figure 5:
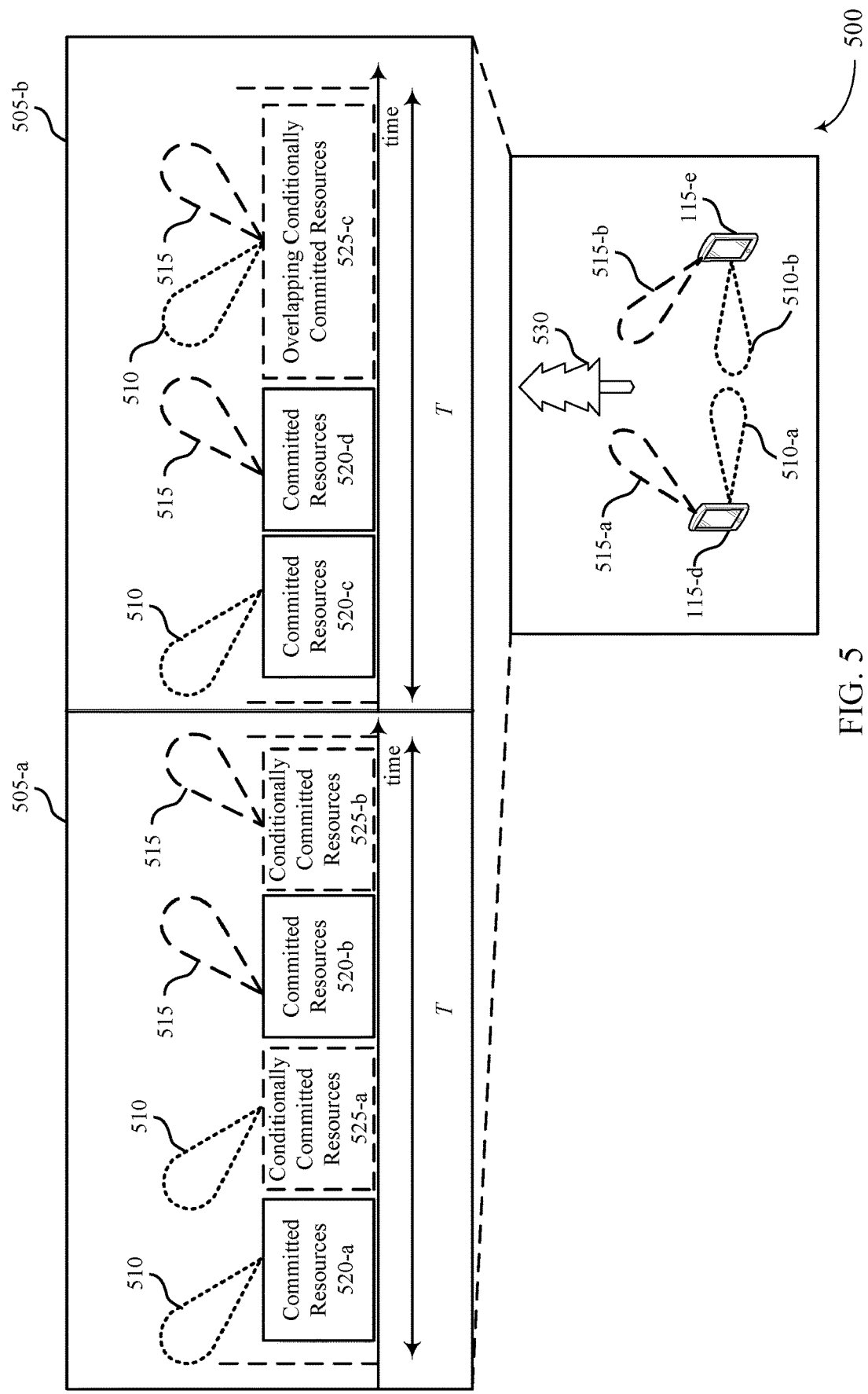
FIG. 5 illustrates an example of a sidelink beam scheduling system that supports receiving beam scheduling for sidelink communications in accordance with aspects of the present disclosure.

FIG. 5 illustrates an example of a sidelink beam scheduling system 500 that supports receiving beam scheduling for sidelink communications in accordance with aspects of the present disclosure. The sidelink beam scheduling system 500 may implement or may be implanted by aspects of the wireless communications system 100 and the wireless communications system 200. For example, the sidelink beam scheduling system 500 may be an example of a scheduling scheme that supports sidelink communications according to a plurality of beam configurations and may include a UE 115-d, and a UE 115-e, a first schedule of resources 505-a, and a second schedule of resources 505-b. The schedules of resources 505-a and 505-b may be implemented individually or in conjunction with each other or one or more other schedules as described herein and each of the schedules of resources 505-*a* and 505-*b* may repeat according to a periodicity, T which may be the same or different for each schedule. The schedules of resources 505-*a* and 505-*b* may be implemented by one or more UE 115 as described with reference to FIG. 1 or by any of the UE 115-*d* and the UE 115-*e*. For example, the UE 115-*d* may perform sidelink communications with the UE 115-*e* according to the schedules of resources 505-*a* and 505-*b*, or vice versa.

In some examples, the UE 115-*d* and the UE 115-*e* may perform a beamforming alignment procedure with one another to determine a set of communications beams for sidelink communications. For example, based on the beamforming alignment procedure, the UE 115-*d* and the UE 115-*e* may determine that the first beam configuration 510 is relatively effective for sidelink communications between the UE 115-*d* and the UE 115-*e*. In some examples, one or more objects 530, such as a tree or a structure, may at least partially reflect beams used during the beamforming alignment procedure and may cause the UE 115-*d* and the UE 115-*e* to identify a second beam configuration 515 for sidelink communications between the UE 115-*d* and the UE 115-*e*. In such examples, the schedules of resources 505-*a* and 505-*b* may include a first set of resources for communications using the first beam configuration 510 and a second set of resources for communications using the second beam configuration 515.

The schedule of resources 505-*a* may include first committed resources 520*a* associated with the first beam configuration 510, second committed resources 520*b* associated with the second beam configuration 515, a first conditionally committed resources 525-*a* associated with the first beam configuration 510, and a second conditionally committed resources 525-*b* associated with the second beam configuration 515, where the first conditionally committed resources 525-*a* and the second conditionally committed resources 525-*b* may be associated with separate resources (e.g., that may be orthogonal resources) of the schedule of resources 505-*a*. For example, the UE 115-*e* may transmit using the first transmit beam configuration 510*b* during the first committed resources 520*a* and the UE 115-*d* may receive using the first receive beam configuration 510*a* during the first committed resources 520-*a*. Likewise, the UE 115-*e* may transmit using the second transmit beam configuration 515-*b* during the second committed resources 520*b* and the UE 115-*d* may receive using the second receive beam configuration 515-*a* during the second committed resources 520-*b*.

In some examples, the UE 115-*d* may receive (e.g., during the committed resources 520-*a*, or 520-*b*, or both) a reservation, an indication, a trigger condition, or the like, for communicating using the conditionally committed resources 525-*a* or 525-*b*. For example, the UE 115-*d* may tune one or more receiving beams to the first receive beam configuration 510*a* during the first committed resources 520*a* and may receive a reservation for one or both of the conditionally committed resources 525-*a* or 525-*b*. In some examples, the UE 115-*d* may tune one or more receiving beams to the second receive beam configuration 515-*a* during the second committed resources 520-*b* and may receive a reservation for the second conditionally committed resources 525-*b*. In some examples, the indication or reservation may be one or more control information bits in the information (e.g., via PSSCH, PSCCH, or the like) received during the committed resources 520*a* or 520-*b*. For example, the indication or reservation may include a single bit contained in SCI or a MAC-CE.

The schedule of resources 505-*b* may include first committed resources 520-*c* associated with the first beam configuration 510, second committed resources 520-*d* associated with the second beam configuration 515, and conditionally committed resources 525-*c* associated with the first beam configuration 510 and the second beam configuration 515, where the conditionally committed resources 525-*c* may include resources associated with the first beam configuration 510 that at least partially overlap (for example, have at least one time resource or frequency resource in common) with resources associated with the second beam configuration 515. For example, the UE 115-*e* may transmit using the first transmit beam configuration 510*b* during the first committed resources 520-*c* and the UE 115-*d* may receive using the first receive beam configuration 510*a* during the first committed resources 520-*c*. Likewise, the UE 115-*e* may transmit using the second transmit beam configuration 515-*b* during the second committed resources 520-*d* and the UE 115-*d* may receive using the second receive beam configuration 515-*a* during the second committed resources 520-*d*.

In some examples, the UE 115-*d* may receive (e.g., during the committed resources 520-*c*, or 520-*d*, or both) a reservation, an indication, a trigger condition, or the like, for communicating using the conditionally committed resources 525-*c*. For example, the UE 115-*d* may tune one or more receiving beams to the beam configuration 510*a* during the first committed resources 520-*c* and may receive a reservation for at least one of the conditionally committed resources 525-*c* associated with either the first beam configuration 510 or the second beam configuration 515. In some examples, the UE 115-*d* may tune one or more receiving beams to the second receive beam configuration 515-*a* during the second committed resources 520-*d* and may receive a reservation for at least one of the conditionally committed resources 525-*c* associated with either the first beam configuration 510 or the second beam configuration 515. Similarly to the schedule of resources 505-*a*, the indication or the reservation may be one or more control information bits in the information (e.g., via PSSCH, PSFCH, PSCCH, or the like) received during the committed resources 520-*c* or 520-*d*. Based on receiving the reservation or the indication, the UE 115-*d* may tune one or more receiving beams to the first beam configuration 510 or the second beam configuration 515 during one or more of the overlapping conditionally committed resources 525-*c* according to the received indication. For example, receiving a reservation or an indication during the first committed resources 520-*c* may indicate to the UE 115-*d* to tune one or more receiving beams to the second beam configuration 515 during one or more of the overlapping conditionally committed resources 525-*c*, or vice versa. Similarly, receiving a reservation or an indication during the second committed resources 520-*d* may indicate to the UE 115-*d* to tune one or more receiving beams to the first beam configuration 510 during one or more of the overlapping conditionally committed resources 525-*c*, or vice versa. In any case, the UE 115-*d* may receive communications from the UE 115-*e* during the overlapping resources using the first beam configuration 510, the second beam configuration, or both.

Figure 6:
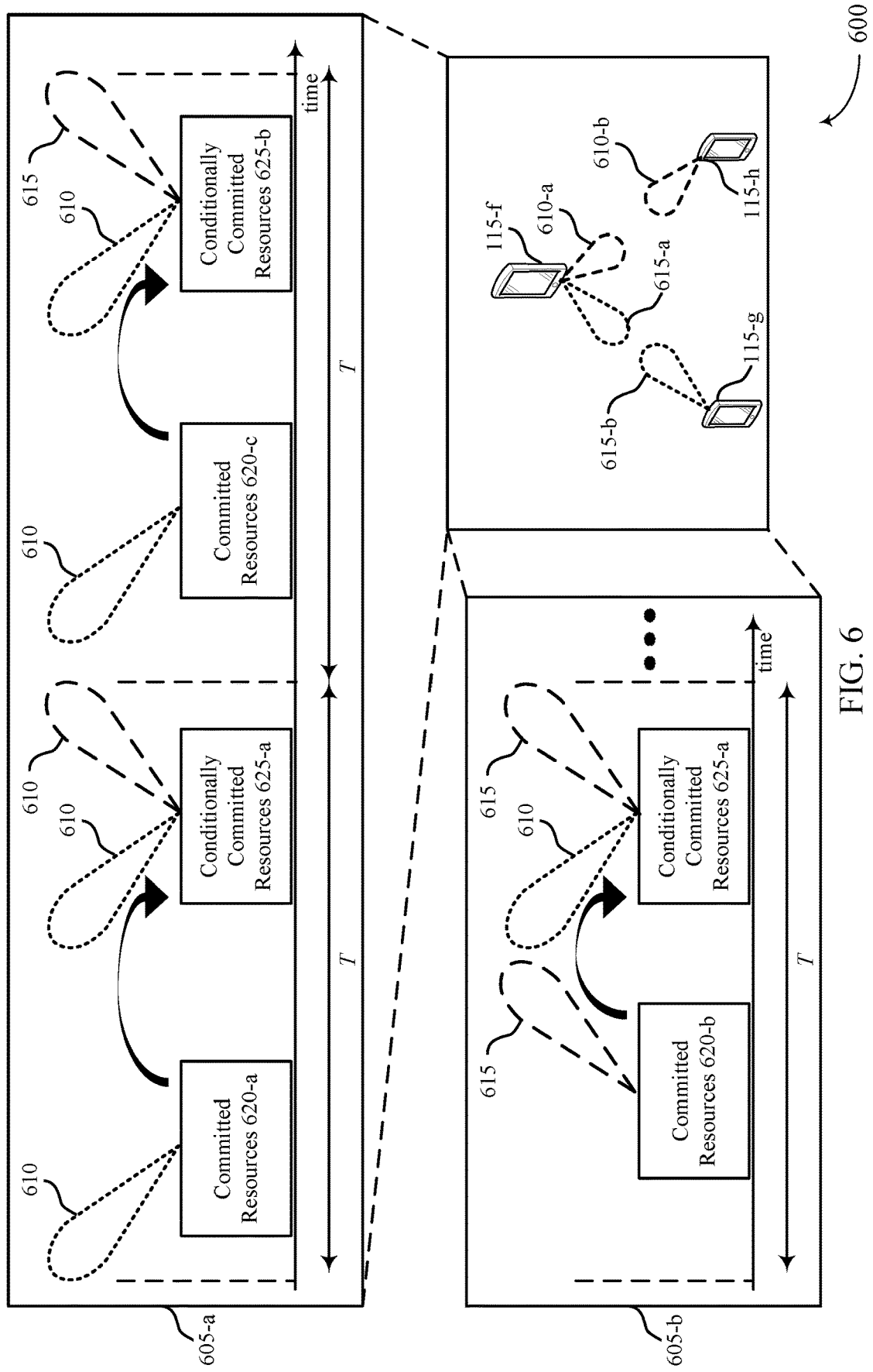
FIG. 6 illustrates an example of a sidelink beam scheduling system that supports receiving beam scheduling for sidelink communications in accordance with aspects of the present disclosure.

FIG. 6 illustrates an example of a sidelink beam scheduling system 600 that supports receiving beam scheduling for sidelink communications in accordance with aspects of the present disclosure. The sidelink beam scheduling system 600 may implement or may be implanted by aspects of the wireless communications system 100 and the wireless communications system 200. For example, the sidelink beam scheduling system 600 may be an example of a scheduling scheme that supports sidelink communications according to a plurality of beam configurations and may include a UE 115-$f$, and a UE 115-$g$, UE115-$h$, a first schedule of resources 605-$a$, and a second schedule of resources 605-$b$. The schedules of resources 605-$a$ and 605-$b$ may be implemented in conjunction with each other or one or more other schedules as described herein and each of the schedules of resources 605-$a$ and 605-$b$ may repeat according to a periodicity, T which may be the same or different for each schedule. The schedules of resources 605-$a$ and 605-$b$ may be implemented by one or more UE 115 as described with reference to FIG. 1 or by any of the UE 115-$f$, the UE 115-$g$, or UE115-$h$. For example, the UE 115-$f$ may perform sidelink communications with the UE 115-$g$ and/or the UE 115-$h$ according to one or more of the schedules of resources 605-$a$ and 605-$b$, or vice versa.

In some examples, the UE 115-$f$, UE 115-$g$, and the UE 115-$h$ may perform a beamforming alignment procedure with one another to determine a set of communications beams for sidelink communications. For example, based on the beamforming alignment procedure, the UE 115-$f$, or the UE 115-$g$, or both may determine that a first beam configuration 610 is relatively effective for sidelink communications between the UE 115-$f$ and the UE 115-$g$. Similarly, based on the beamforming alignment procedure, the UE 115-$f$, or the UE 115-$h$, or both may determine that a second beam configuration 615 is relatively effective for sidelink communications between the UE 115-$f$ and the UE 115-$h$. In such examples, the schedules of resources 605-$a$ and 605-$b$ may include resources for communications using the first beam configuration 610 and resources for communications using the second beam configuration 615.

In some examples, the UE 115-$f$ may be configured with both of the schedules of resources 605-$a$ and 605-$b$. For example, the schedule of resources 605-$a$ may be a schedule for communications with UE 115-$h$ and the schedule of resources 605-$b$ may be a schedule for communications with UE 115-$g$. In some examples, the schedules of resources 605-$a$ and 605-$b$ may include conditionally committed resources 625-$a$ and 625-$c$ which may include pooled resources for communicating using the first beam configuration 610 and/or the second beam configuration 615 that may be reserved or assigned according to a hand-shaking procedure, similar to the hand-shaking procedure described with reference to FIG. 4.

For example, the schedule of resources 605-$a$ may include first committed resources 620$a$ associated with the first beam configuration 610, second committed resources 620-$c$ associated with the first beam configuration 610, and conditionally committed resources 625-$a$ and 625-$b$ associated with pooled resources for communications using the first beam configuration 610 and the second beam configuration 615. For example, the conditionally committed resources 625-$a$ and 625-$b$ includes resources associated with the first beam configuration 610 that at least partially overlap with resources associated with the second beam configuration 615. For example, the UE 115-$h$ may transmit using the first transmit beam configuration 610-$b$ during the first committed resources 620$a$ and the UE 115-$d$ may receive using the first receive beam configuration 610$b$ during the first committed resources 620-$a$. Similarly for schedule of resources 605-$b$, the UE 115-$g$ may transmit using the second transmit beam configuration 615-$b$ during the committed resources 620$b$ and the UE 115-$f$ may receive using the second receive beam configuration 615-$a$ during the committed resources 620-$b$.

In some examples, the UE 115-$f$ may receive (e.g., during the committed resources 620-$a$, or 620-$b$, or both) a reservation, an indication, a trigger condition, or the like, for communicating using the conditionally committed resources 625-$a$. For example, the UE 115-$f$ may tune one or more receiving beams to the first receive beam configuration 610$a$ during the committed resources 620$a$ and may receive a reservation for at least one of the conditionally committed resources 625-$a$ associated with the first beam configuration 610. Additionally, the UE 115-$f$ may tune one or more receiving beams to the second receive beam configuration 615-$a$ during the committed resources 620$b$ and may receive a reservation for the at least one conditionally committed resource 625-$a$ associated with the first beam configuration 610. That is, the UE 115-$f$ may receive a reservation or an indication to use the same resources of the conditionally committed resources 625-$a$ for receiving communications using the first beam configuration 610 and for receiving communications using the second beam configuration 615 thus causing a potential conflict. In such cases, the handshaking procedure of FIG. 4 may additionally include a priority associated with each of the transmissions to be received in the conditionally committed resources 625-$a$. In some cases, the priorities are provided by the UE 115-$g$ and 115-$g$ at the request of the UE 115-$f$.

In such examples, the UE 115-$f$ may tune to the first beam configuration 610 or the second beam configuration 615 associated with the higher priority during the conditionally committed resources 625-$a$.

Figure 7:
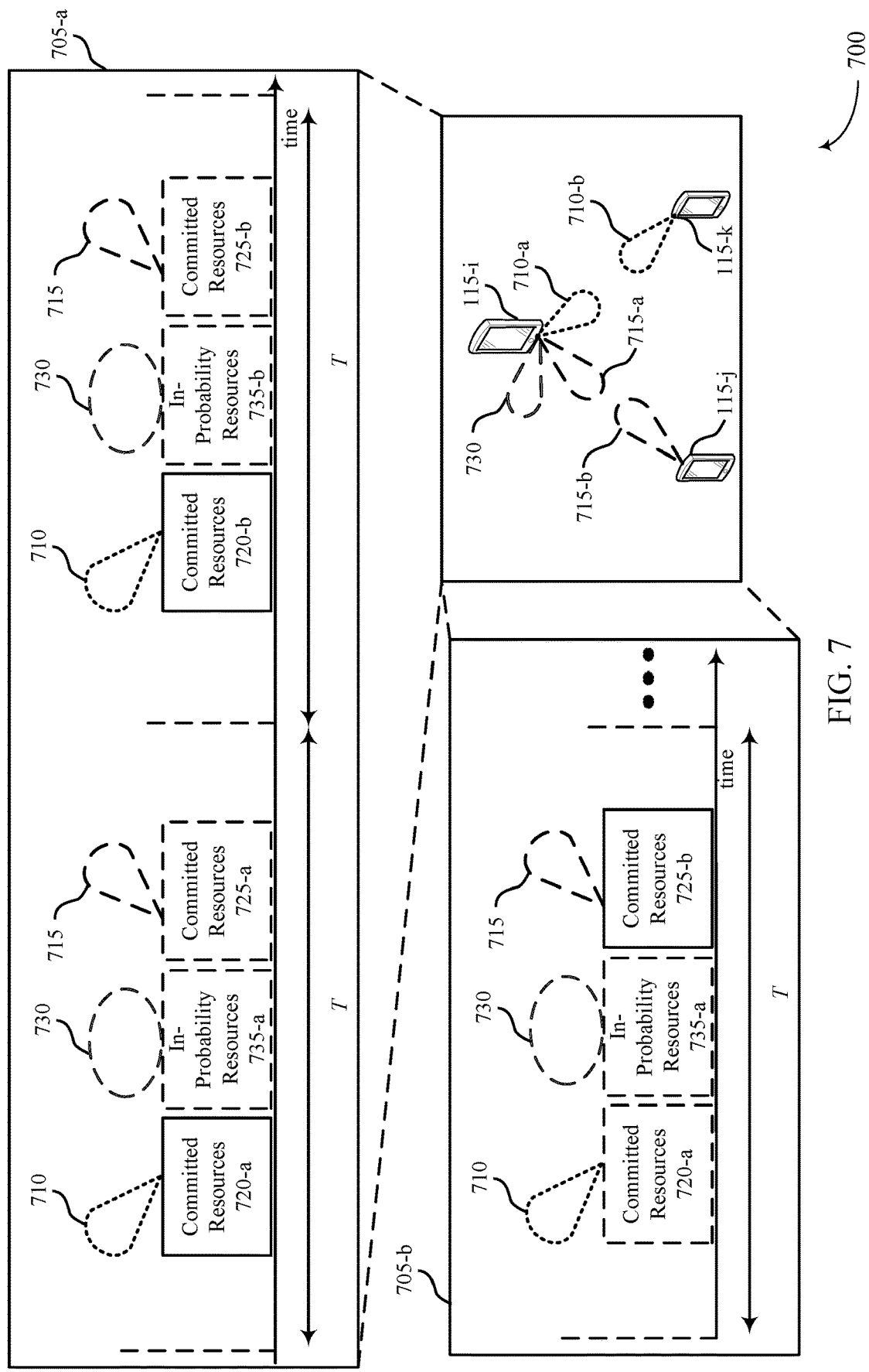
FIG. 7 illustrates an example of a sidelink beam scheduling system that supports receiving beam scheduling for sidelink communications in accordance with aspects of the present disclosure.

FIG. 7 illustrates an example of a sidelink beam scheduling system 700 that supports receiving beam scheduling for sidelink communications in accordance with aspects of the present disclosure. The sidelink beam scheduling system 700 may implement or may be implanted by aspects of the wireless communications system 100 and the wireless communications system 200. For example, the sidelink beam scheduling system 700 may be an example of a scheduling scheme that supports sidelink communications according to a plurality of beam configurations and may include a UE 115-$i$, and a UE 115-$j$, UE115-$k$, a first schedule of resources 705-$a$ for communications between the UE 115-$i$ and the UE 115-$k$, and a second schedule of resources 705-$b$ for communications between the UE 115-I and the UE 115-$j$. The schedules of resources 705-$a$ and 705-$b$ may be implemented in conjunction with each other or one or more other schedules as described herein and each of the schedules of resources 705-$a$ and 705-$b$ may repeat according to a periodicity, T which may be the same or different for each schedule. The schedules of resources 705-$a$ and 705-$b$ may be implemented by one or more UE 115 as described with reference to FIG. 1 or by any of the UE 115-$i$, the UE 115-$j$, or UE 115-$k$. For example, the UE 115-$i$ may perform sidelink communications with the UE 115-$j$ and/or the UE 115-$k$ according to one or more of the schedules of resources 605-$a$ and 605-$b$, or vice versa.

In some examples, the UE 115-$i$, UE 115-$j$, and the UE 115-$k$ may perform a beamforming alignment procedure with one another to determine a set of communications beams for sidelink communications. For example, based on the beamforming alignment procedure, the UE 115-$i$ and the UE 115-$k$ may determine that a first beam configuration 710 is relatively effective for sidelink communications between the UE 115-$i$ and the UE 115-$k$. Similarly, based on the beamforming alignment procedure, the UE 115-$i$ and the UE 115-$j$ may determine that a second beam configuration 715 is relatively effective for sidelink communications between the UE 115-$i$ and the UE 115-$j$. In such examples, the schedules of resources 705-a and 705-b may respectively include resources for communications using the first beam configuration 710 and resources for communications using the second beam configuration 715. Additionally, some examples, the schedules of resources 705 may each include a set of in-probability resources 735 during which the UE 115-i may tune to a third beam configuration 730. In some examples, the set of in-probability resources 735 may be uncommitted to other UE 115. For example, the UE 115-i may tune one or more receiving beams using the third beam configuration 730 based on in-probability. For example, the schedules of resources 705 may include the set of in-probability resources 735 where the probability of tuning to the third beam configuration is larger than a threshold (e.g., a pre-defined threshold).

In some examples, the set of committed resources 720 may be committed by the UE 115-i for receiving from the UE 115-j or the UE 115-k. The schedule of resources communicated and/or finalized between the UE 115-i and the UE 115-j and/or UE 115-k may indicate the set of committed resources 720 for both the UE 115-j or UE 115-k. Additionally, or alternatively, the schedule or resources may include a set of slots that have been committed to a receiving beam that is not included in the beamforming alignment output between a first UE (e.g., UE 115-i) and a second UE (e.g., UE 115-j or UE 115-k). Such committed resources being indicated in the schedule of resources may assist the UE 115-i, the UE 115-j, and the UE 115-k in beam recovery and for arranging multi-hop sidelink communications.

Figure 8:
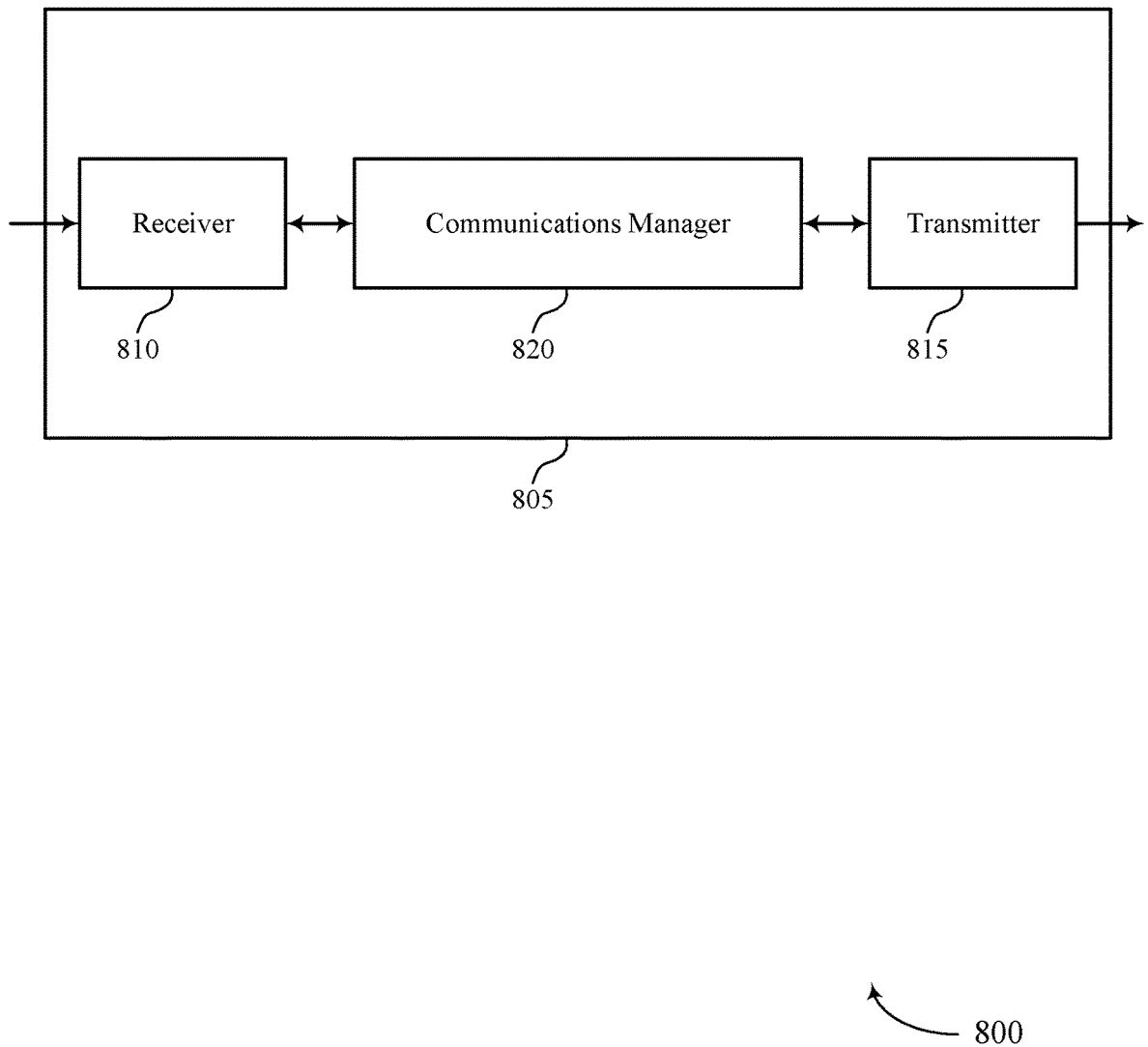
FIGS. 8 and 9 show block diagrams of devices that support receiving beam scheduling for sidelink communications in accordance with aspects of the present disclosure.

FIG. 8 shows a block diagram 800 of a device 805 that supports receiving beam scheduling for sidelink communications in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to receiving beam scheduling for sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to receiving beam scheduling for sidelink communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of receiving beam scheduling for sidelink communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first wireless device in accordance with examples as disclosed herein. For example, the communications manager 820 may be configured as or otherwise support a means for receiving an indication of a schedule of resources for sidelink communications to be performed over a communication beam, the schedule of resources indicating a set of resources corresponding to a beam configuration for the sidelink communications with a second wireless device. The communications manager 820 may be configured as or otherwise support a means for communicating with the second wireless device via one or more sidelink channels based on configuring the communication beam using the beam configuration over the set of resources.

Additionally, or alternatively, the communications manager 820 may support wireless communication at a second wireless device in accordance with examples as disclosed herein. For example, the communications manager 820 may be configured as or otherwise support a means for transmitting an indication of a schedule of resources for sidelink communications to be performed over a communication beam, the schedule of resources indicating a set of resources corresponding to a beam configuration for the sidelink communications with a first wireless device. The communications manager 820 may be configured as or otherwise support a means for communicating with the first wireless device via one or more sidelink channels based on configuring the communication beam using the beam configuration over the set of resources.

By including or configuring the communications manager 820 in accordance with examples as described herein, the device 805 (e.g., a processor controlling or otherwise coupled to the receiver 810, the transmitter 815, the communications manager 820, or any combination thereof) may support techniques for reduced processing, reduced power consumption and more efficient utilization of communication resources, among other aspects.

Figure 9:
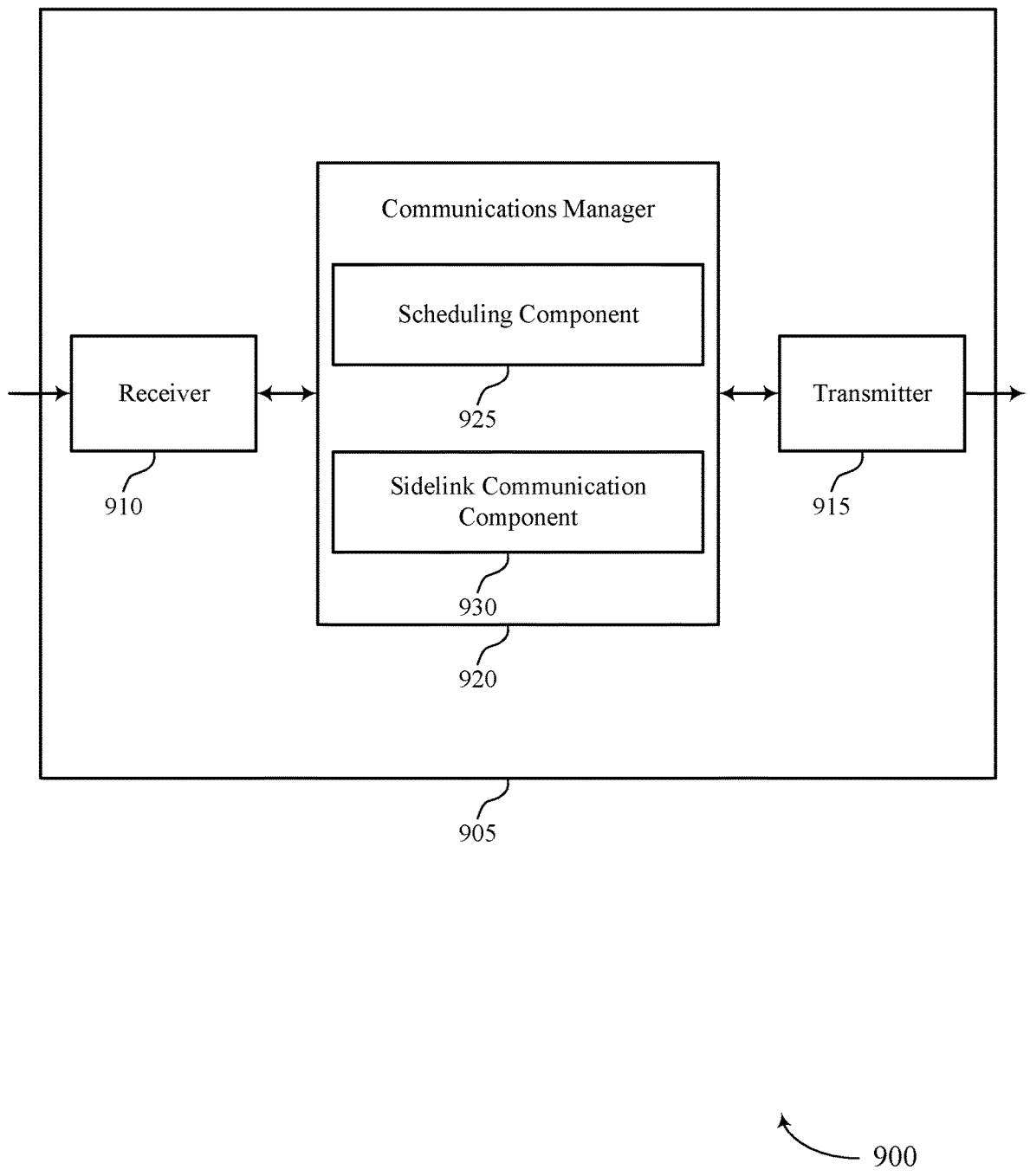

FIG. 9 shows a block diagram 900 of a device 905 that supports receiving beam scheduling for sidelink communications in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to receiving beam scheduling for sidelink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to receiving beam scheduling for sidelink communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of receiving beam scheduling for sidelink communications as described herein. For example, the communications manager 920 may include a scheduling component 925 a sidelink communication component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first wireless device in accordance with examples as disclosed herein. The scheduling component 925 may be configured as or otherwise support a means for receiving an indication of a schedule of resources for sidelink communications to be performed over a communication beam, the schedule of resources indicating a set of resources corresponding to a beam configuration for the sidelink communications with a second wireless device. The sidelink communication component 930 may be configured as or otherwise support a means for communicating with the second wireless device via one or more sidelink channels based on configuring the communication beam using the beam configuration over the set of resources.

Additionally, or alternatively, the communications manager 920 may support wireless communication at a second wireless device in accordance with examples as disclosed herein. The scheduling component 925 may be configured as or otherwise support a means for transmitting an indication of a schedule of resources for sidelink communications to be performed over a communication beam, the schedule of resources indicating a set of resources corresponding to a beam configuration for the sidelink communications with a first wireless device. The sidelink communication component 930 may be configured as or otherwise support a means for communicating with the first wireless device via one or more sidelink channels based on configuring the communication beam using the beam configuration over the set of resources.

Figure 10:
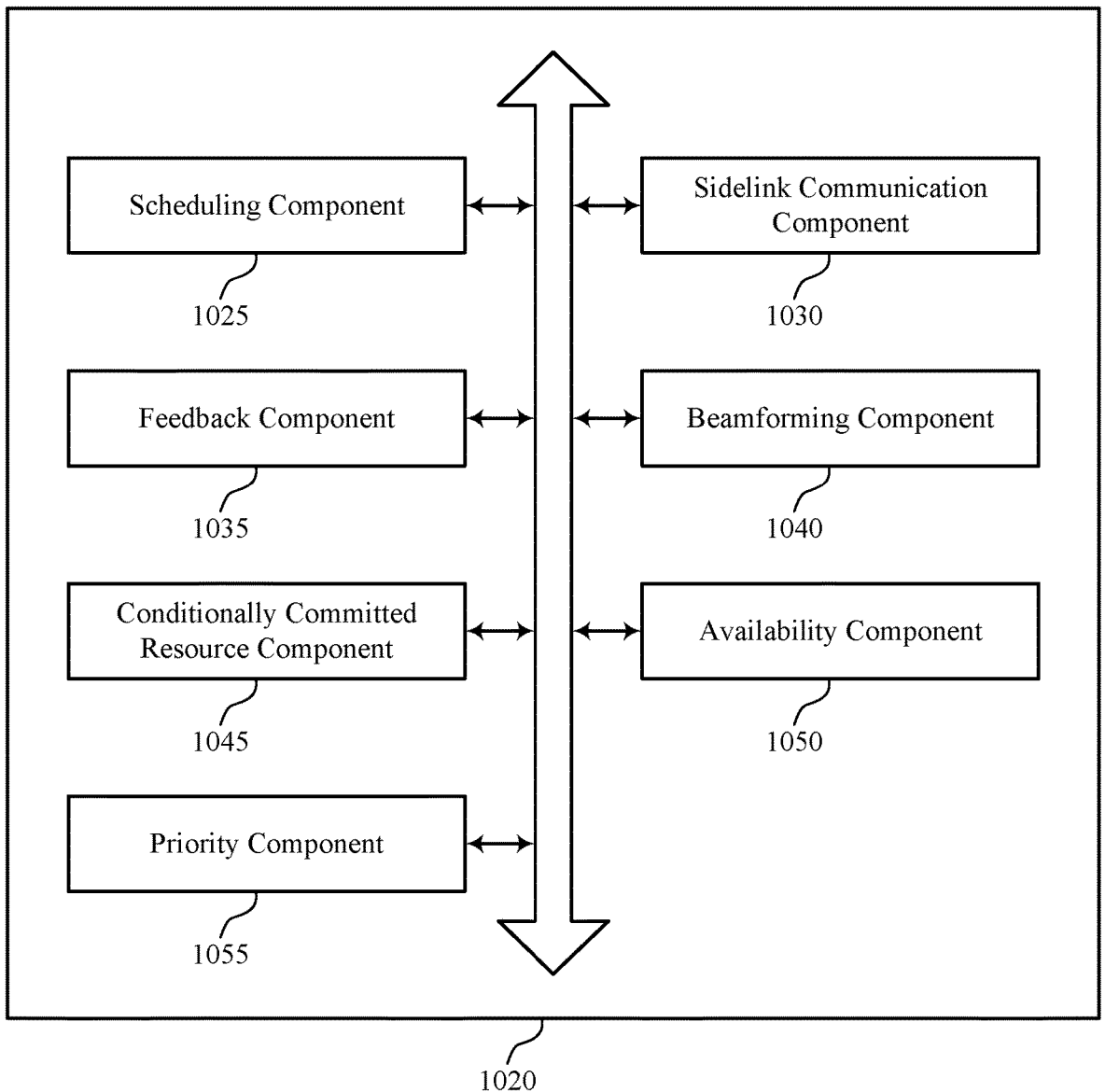
FIG. 10 shows a block diagram of a communications manager that supports receiving beam scheduling for sidelink communications in accordance with aspects of the present disclosure.

FIG. 10 shows a block diagram 1000 of a communications manager 1020 that supports receiving beam scheduling for sidelink communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of receiving beam scheduling for sidelink communications as described herein. For example, the communications manager 1020 may include a scheduling component 1025, a sidelink communication component 1030, a feedback component 1035, a beamforming component 1040, a conditionally committed resource component 1045, an availability component 1050, a priority component 1055, or any combination thereof. Each of these components may communicate, directly or indirectly, with one another (e.g., via one or more buses).

The communications manager 1020 may support wireless communication at a first wireless device in accordance with examples as disclosed herein. The scheduling component 1025 may be configured as or otherwise support a means for receiving an indication of a schedule of resources for sidelink communications to be performed over a communication beam, the schedule of resources indicating a set of resources corresponding to a beam configuration for the sidelink communications with a second wireless device. The sidelink communication component 1030 may be configured as or otherwise support a means for communicating with the second wireless device via one or more sidelink channels based on configuring the communication beam using the beam configuration over the set of resources.

In some examples, the indication of the schedule of resources is received in a confirmation of the schedule of resources established by the second wireless device.

In some examples, the indication of the schedule of resources is received in a request to establish the schedule of resources.

In some examples, to support communicating with the second wireless device, the feedback component 1035 may be configured as or otherwise support a means for transmitting, via a first sidelink channel of the one or more sidelink channels, feedback to the second wireless device over at least one resource of the second set of resources using the beam configuration for the sidelink communications with the second wireless device.

In some examples, the indication of the schedule of resources is received from a network device.

In some examples, the beamforming component 1040 may be configured as or otherwise support a means for performing a beamforming alignment procedure with the second wireless device and a third wireless device, where the beam configuration is based on performing the beamforming alignment procedure. In some examples, the scheduling component 1025 may be configured as or otherwise support a means for identifying a second set of resources that have been scheduled between the first wireless device and the third wireless device based on receiving the indication of the schedule of resources, the second set of resources corresponding to a second beam configuration identified during the beamforming alignment procedure.

In some examples, the beamforming component 1040 may be configured as or otherwise support a means for performing a beamforming alignment procedure with the second wireless device, where the beam configuration is based on performing the beamforming alignment procedure. In some examples, the scheduling component 1025 may be configured as or otherwise support a means for identifying a set of beam configurations for communicating with the second wireless device, where the schedule of resources includes a first set of resources corresponding to a first beam configuration of the set of beam configurations and a second set of resources corresponding to a second beam configuration of the set of beam configurations.

In some examples, the first set of resources is orthogonal to the second set of resources.

In some examples, the scheduling component 1025 may be configured as or otherwise support a means for identifying a third set of resources and a fourth set of resources of the schedule of resources. In some examples, the conditionally committed resource component 1045 may be configured as or otherwise support a means for receiving, from the second wireless device over at least one resource of the first set of resources, an indication to communicate with the second wireless device over at least one resource of the third set of resources using the first beam configuration. In some examples, the conditionally committed resource component 1045 may be configured as or otherwise support a means for receiving, from the second wireless device over at least one resource of the second set of resources, an indication to communicate with the second wireless device over at least one resource of the fourth set of resources using the second beam configuration.

In some examples, the third set of resources and the fourth set of resources at least partially overlap.

In some examples, the indication to communicate with the second wireless device over the at least one resource of the third set of resources using the first beam configuration is received using the first beam configuration or the second beam configuration.

In some examples, the conditionally committed resource component 1045 may be configured as or otherwise support a means for identifying a second set of resources of the schedule of resources, the second set of resources associated with a condition for performing the sidelink communications with the second wireless device over the second set of resources, where communicating with the second wireless device via the one or more sidelink channels is based on identifying the second set of resources.

In some examples, the conditionally committed resource component 1045 may be configured as or otherwise support a means for receiving, from the second wireless device over at least one resource of the set of resources, an indication to communicate with the second wireless device over at least one resource of the second set of resources using the beam configuration, where communicating with the second wireless device via the one or more sidelink channels is based on the indication to communicate with the second wireless device.

In some examples, the indication to communicate over at least one resource of the second set of resources is received via a second beam configuration associated with a sidelink channel of the one or more sidelink channels.

In some examples, to support receiving the indication to communicate with the second wireless device over the at least one resource of the second set of resources, the conditionally committed resource component 1045 may be configured as or otherwise support a means for receiving a request over the at least one resource of the set of resources, where the condition includes receiving the request.

In some examples, the request is received via a feedback channel.

In some examples, the availability component 1050 may be configured as or otherwise support a means for transmitting, to the second wireless device, an indication that the second set of resources of the schedule of resources is available for the sidelink communications based on receiving the indication to communicate with the second wireless device over the at least one resource of the second set of resources. In some examples, the feedback component 1035 may be configured as or otherwise support a means for receiving, from the second wireless device, a second indication to communicate with the second wireless device over the at least one resource of the second set of resources via a feedback channel based on transmitting the indication.

In some examples, a hybrid automatic repeat request response associated with communications between the first wireless device and the second wireless device is received via the feedback channel or is received via a second feedback channel.

In some examples, the priority component 1055 may be configured as or otherwise support a means for receiving a third indication to communicate with a third wireless device over at least one resource of a third set of resources that at least partially overlaps with the second set of resources, where the second indication includes a first priority associated with communications with the second wireless device and the third indication includes a second priority associated with communications with the third wireless device. In some examples, the sidelink communication component 1030 may be configured as or otherwise support a means for communicating with one of the first wireless device or the second wireless device over one of a resource of the second set of resources or a resource of the third set of resources using a corresponding beam configuration based on at least one of the first priority or the second priority.

In some examples, the availability component 1050 may be configured as or otherwise support a means for transmitting, to the second wireless device, an indication that the second set of resources of the schedule of resources is available for the sidelink communications, where communicating with the second wireless device via the one or more sidelink channels is based on the availability of the second set of resources of the schedule of resources.

In some examples, to support transmitting the indication that the second set of resources of the schedule of resources is available, the feedback component 1035 may be configured as or otherwise support a means for transmitting the indication via a sidelink feedback channel of the one or more sidelink channels.

In some examples, identifying the set of resources of the schedule of resources is based on a traffic volume associated with the sidelink communications between the first wireless device and the second wireless device.

In some examples, the scheduling component 1025 may be configured as or otherwise support a means for identifying a second set of resources of the schedule of resources, the second set of resources corresponding to a second beam configuration for the sidelink communications with a third wireless device, where identifying the second set of resources is based on receiving the indication of the schedule of resources. In some examples, the sidelink communication component 1030 may be configured as or otherwise support a means for communicating the sidelink communications with the third wireless device via the one or more sidelink channels based on configuring the communication beam using the second beam configuration over the second set of resources.

In some examples, the scheduling component 1025 may be configured as or otherwise support a means for identifying a third set of resources of the schedule of resources based on receiving the indication of the schedule of resources, the third set of resources corresponding to a third beam configuration associated with communications at the first wireless device according to a threshold, where communicating with the second wireless device is based at least at in part identifying the third set of resources.

Additionally, or alternatively, the communications manager 1020 may support wireless communication at a second wireless device in accordance with examples as disclosed herein. In some examples, the scheduling component 1025 may be configured as or otherwise support a means for transmitting an indication of a schedule of resources for sidelink communications to be performed over a communication beam, the schedule of resources indicating a set of resources corresponding to a beam configuration for the sidelink communications with a first wireless device. In some examples, the sidelink communication component 1030 may be configured as or otherwise support a means for communicating with the first wireless device via one or more sidelink channels based on configuring the communication beam using the beam configuration over the set of resources.

In some examples, the indication of the schedule of resources is transmitted in a confirmation of the schedule of resources established by the second wireless device.

In some examples, the indication of the schedule of resources is transmitted in a request to establish the schedule of resources.

In some examples, to support communicating with the first wireless device, the feedback component 1035 may be configured as or otherwise support a means for receiving, via a first sidelink channel of the one or more sidelink channels, feedback from the first wireless device over at least one resource of the second set of resources using the beam configuration for the sidelink communications with the first wireless device.

Figure 11:
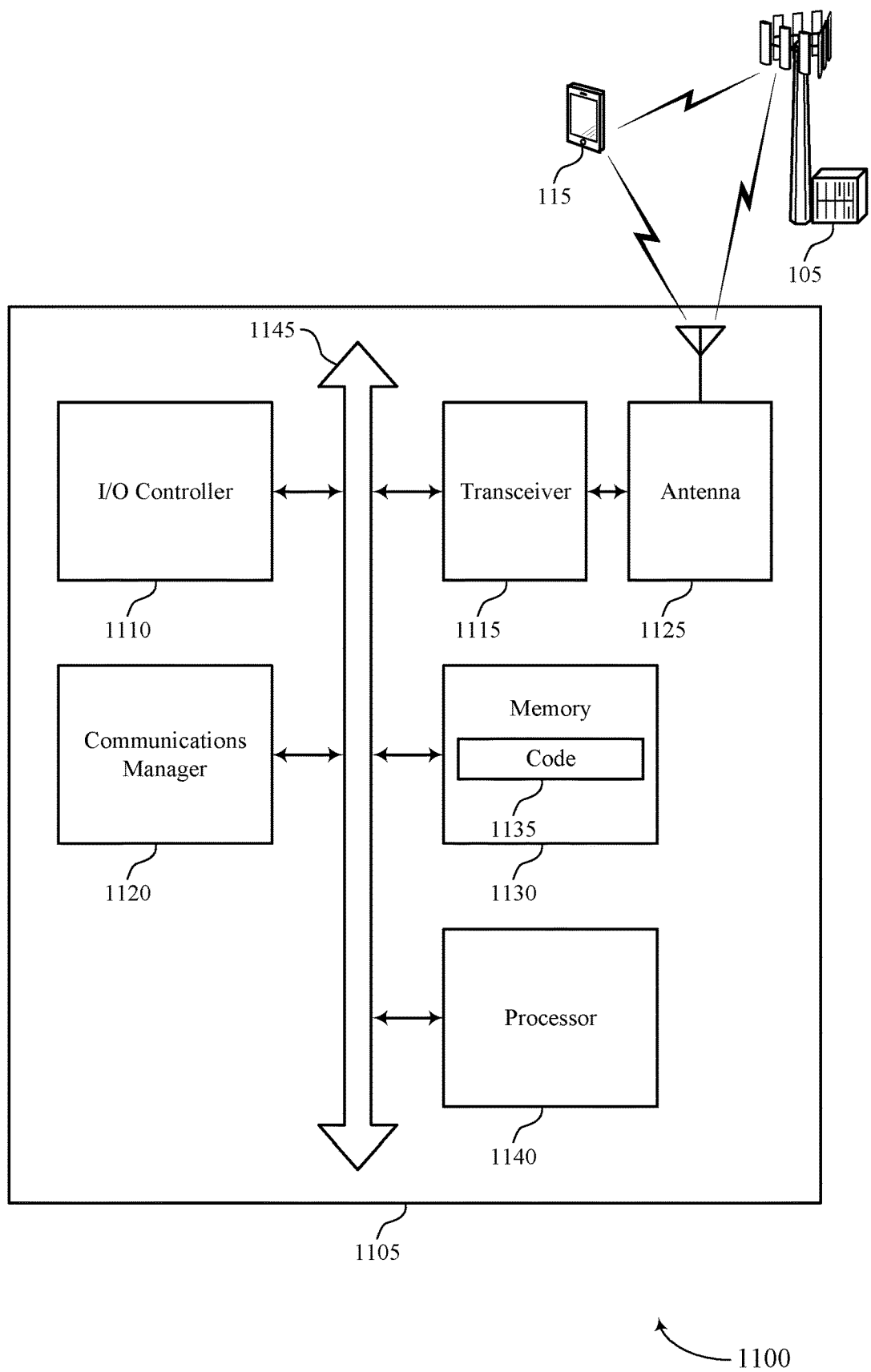
FIG. 11 shows a diagram of a system including a device that supports receiving beam scheduling for sidelink communications in accordance with aspects of the present disclosure.

FIG. 11 shows a diagram of a system 1100 including a device 1105 that supports receiving beam scheduling for sidelink communications in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting receiving beam scheduling for sidelink communications). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a first wireless device in accordance with examples as disclosed herein. For example, the communications manager 1120 may be configured as or otherwise support a means for receiving an indication of a schedule of resources for sidelink communications to be performed over a communication beam, the schedule of resources indicating a set of resources corresponding to a beam configuration for the sidelink communications with a second wireless device. The communications manager 1120 may be configured as or otherwise support a means for communicating with the second wireless device via one or more sidelink channels based on configuring the communication beam using the beam configuration over the set of resources.

Additionally, or alternatively, the communications manager 1120 may support wireless communication at a second wireless device in accordance with examples as disclosed herein. For example, the communications manager 1120 may be configured as or otherwise support a means for transmitting an indication of a schedule of resources for sidelink communications to be performed over a communication beam, the schedule of resources indicating a set of resources corresponding to a beam configuration for the sidelink communications with a first wireless device. The communications manager 1120 may be configured as or otherwise support a means for communicating with the first wireless device via one or more sidelink channels based on configuring the communication beam using the beam configuration over the set of resources.

By including or configuring the communications manager 1120 in accordance with examples as described herein, the device 1105 may support techniques for improved communication reliability, reduced latency, more efficient utilization of communication resources, improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of receiving beam scheduling for sidelink communications as described herein, or the processor 1140 and the memory 1130 may be otherwise configured to perform or support such operations.

Figure 12:
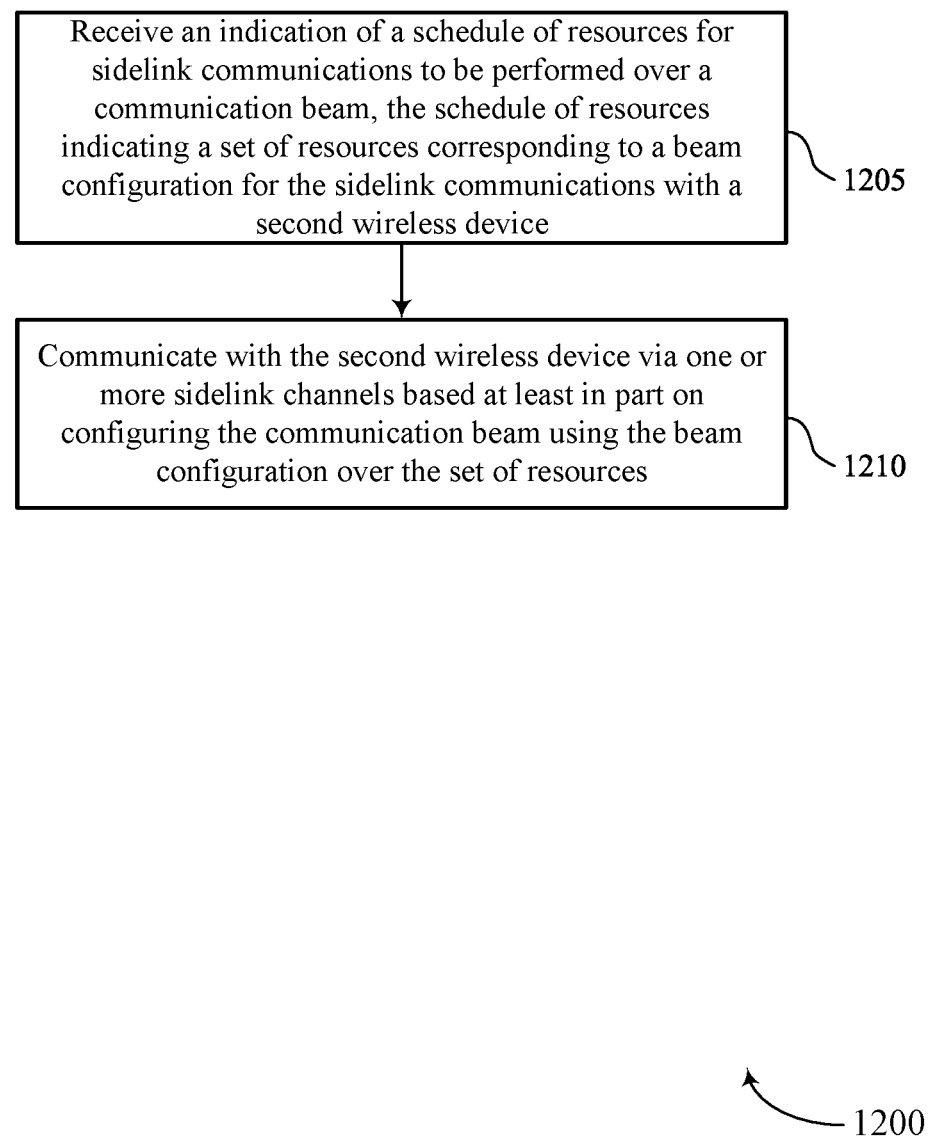
FIGS. 12 through 16 show flowcharts illustrating methods that support receiving beam scheduling for sidelink communications in accordance with aspects of the present disclosure.

FIG. 12 shows a flowchart illustrating a method 1200 that supports receiving beam scheduling for sidelink communications in accordance with aspects of the present disclosure. The operations of the method 1200 may be implemented by a UE or its components as described herein. For example, the operations of the method 1200 may be performed by a UE 115 (e.g., a first wireless device) as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include receiving an indication of a schedule of resources for sidelink communications to be performed over a communication beam, the schedule of resources indicating a set of resources corresponding to a beam configuration for the sidelink communications with a second wireless device. The operations of 1205 may be performed in accordance with examples as disclosed herein. In some examples, aspects of the operations of 1205 may be performed by a scheduling component 1025 as described with reference to FIG. 10.

At 1210, the method may include communicating with the second wireless device via one or more sidelink channels based on configuring the communication beam using the beam configuration over the set of resources. The operations of 1210 may be performed in accordance with examples as disclosed herein. In some examples, aspects of the operations of 1210 may be performed by a sidelink communication component 1030 as described with reference to FIG. 10.

Figure 13:
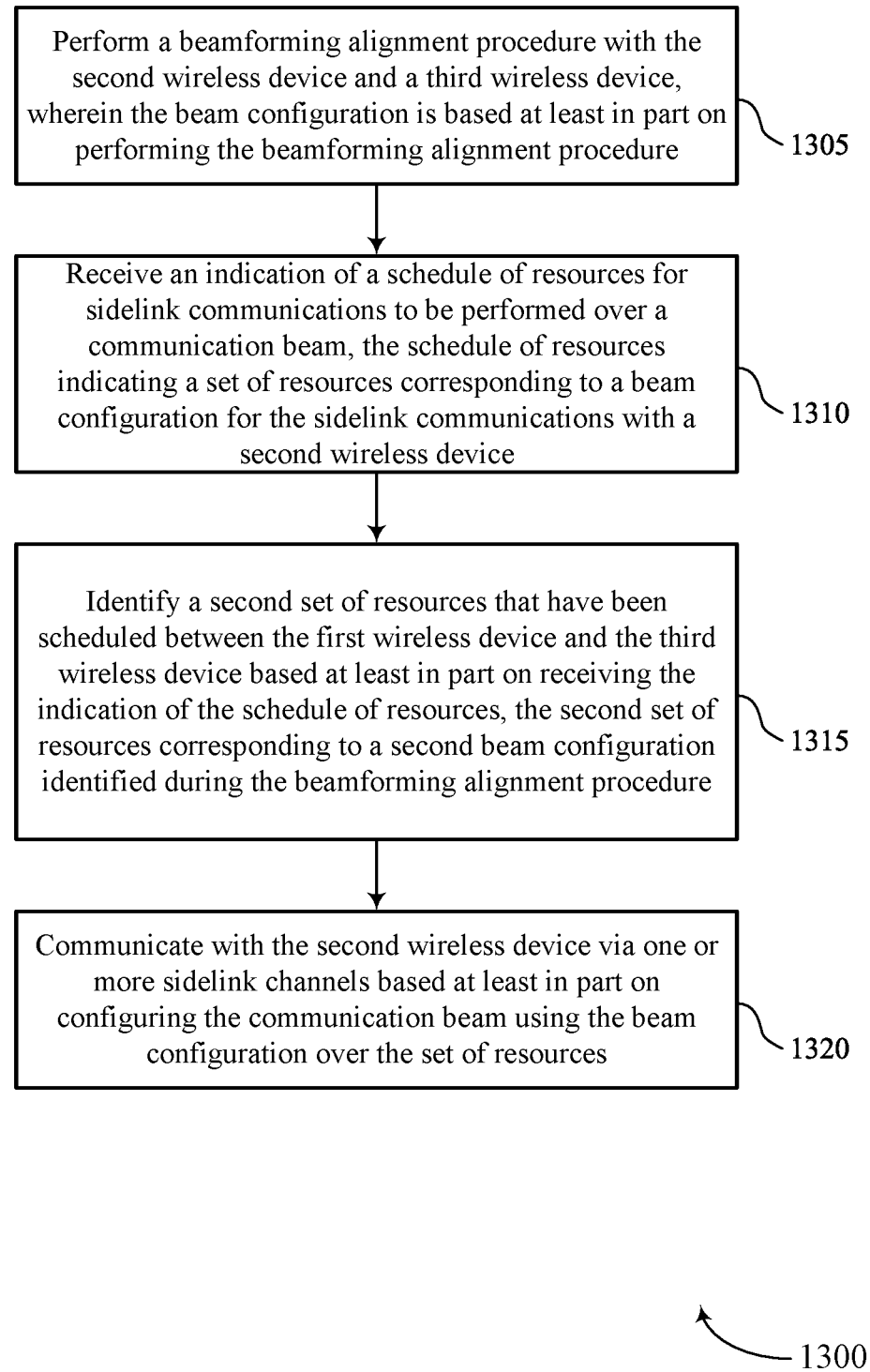

FIG. 13 shows a flowchart illustrating a method 1300 that supports receiving beam scheduling for sidelink communications in accordance with aspects of the present disclosure. The operations of the method 1300 may be implemented by a UE or its components as described herein. For example, the operations of the method 1300 may be performed by a UE 115 (e.g., a first wireless device) as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include performing a beamforming alignment procedure with a second wireless device and a third wireless device, where the beam configuration is based on performing the beamforming alignment procedure. The operations of 1305 may be performed in accordance with examples as disclosed herein. In some examples, aspects of the operations of 1305 may be performed by a beamforming component 1040 as described with reference to FIG. 10.

At 1310, the method may include receiving an indication of a schedule of resources for sidelink communications to be performed over a communication beam, the schedule of resources indicating a set of resources corresponding to a beam configuration for the sidelink communications with a second wireless device. The operations of 1310 may be performed in accordance with examples as disclosed herein. In some examples, aspects of the operations of 1310 may be performed by a scheduling component 1025 as described with reference to FIG. 10.

At 1315, the method may include identifying a second set of resources that have been scheduled between the first wireless device and the third wireless device based on receiving the indication of the schedule of resources, the second set of resources corresponding to a second beam configuration identified during the beamforming alignment procedure. The operations of 1315 may be performed in accordance with examples as disclosed herein. In some examples, aspects of the operations of 1315 may be performed by a scheduling component 1025 as described with reference to FIG. 10.

At 1320, the method may include communicating with the second wireless device via one or more sidelink channels based on configuring the communication beam using the beam configuration over the set of resources. The operations of 1320 may be performed in accordance with examples as disclosed herein. In some examples, aspects of the operations of 1320 may be performed by a sidelink communication component 1030 as described with reference to FIG. 10.

Figure 14:
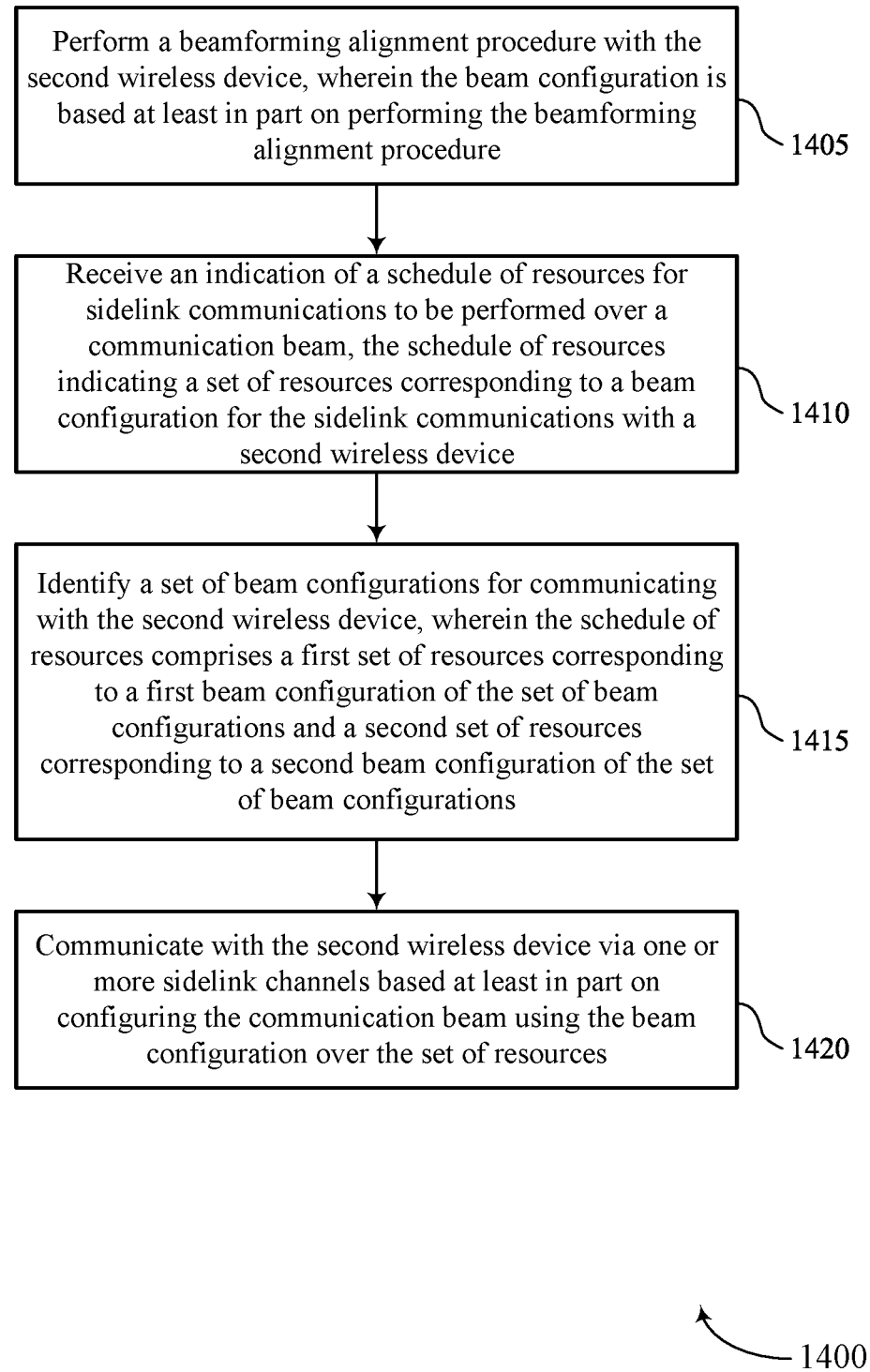

FIG. 14 shows a flowchart illustrating a method 1400 that supports receiving beam scheduling for sidelink communications in accordance with aspects of the present disclosure. The operations of the method 1400 may be implemented by a UE or its components as described herein. For example, the operations of the method 1400 may be performed by a UE 115 (e.g., a first wireless device) as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include performing a beamforming alignment procedure with a second wireless device, where the beam configuration is based on performing the beamforming alignment procedure. The operations of 1405 may be performed in accordance with examples as disclosed herein. In some examples, aspects of the operations of 1405 may be performed by a beamforming component 1040 as described with reference to FIG. 10.

At 1410, the method may include receiving an indication of a schedule of resources for sidelink communications to be performed over a communication beam, the schedule of resources indicating a set of resources corresponding to a beam configuration for the sidelink communications with a second wireless device. The operations of 1410 may be performed in accordance with examples as disclosed herein. In some examples, aspects of the operations of 1410 may be performed by a scheduling component 1025 as described with reference to FIG. 10.

At 1415, the method may include identifying a set of beam configurations for communicating with the second wireless device, where the schedule of resources includes a first set of resources corresponding to a first beam configuration of the set of beam configurations and a second set of resources corresponding to a second beam configuration of the set of beam configurations. The operations of 1415 may be performed in accordance with examples as disclosed herein. In some examples, aspects of the operations of 1415 may be performed by a scheduling component 1025 as described with reference to FIG. 10.

At 1420, the method may include communicating with the second wireless device via one or more sidelink channels based on configuring the communication beam using the beam configuration over the set of resources. The operations of 1420 may be performed in accordance with examples as disclosed herein. In some examples, aspects of the operations of 1420 may be performed by a sidelink communication component 1030 as described with reference to FIG. 10.

Figure 15:
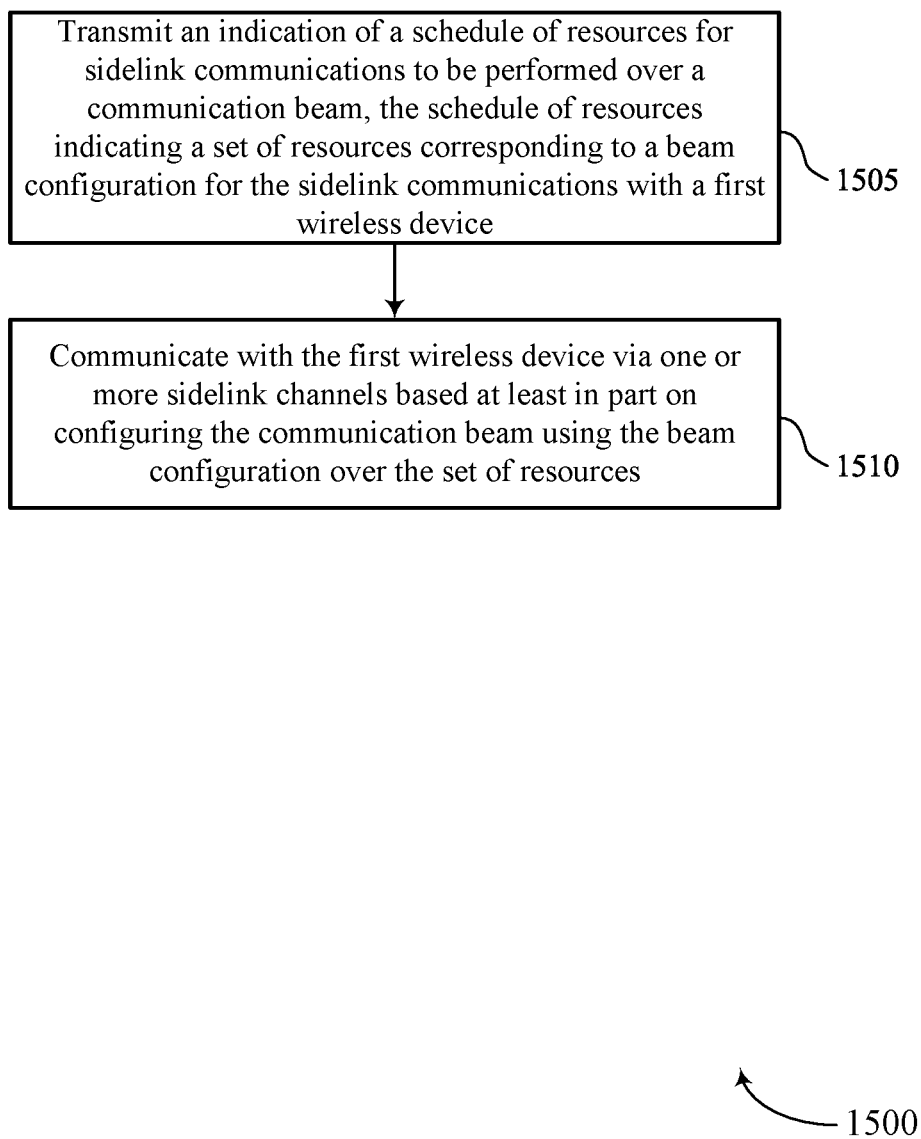

FIG. 15 shows a flowchart illustrating a method 1500 that supports receiving beam scheduling for sidelink communications in accordance with aspects of the present disclosure. The operations of the method 1500 may be implemented by a UE or its components as described herein. For example, the operations of the method 1500 may be performed by a UE 115 (e.g., a second wireless device) as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include transmitting an indication of a schedule of resources for sidelink communications to be performed over a communication beam, the schedule of resources indicating a set of resources corresponding to a beam configuration for the sidelink communications with a first wireless device. The operations of 1505 may be performed in accordance with examples as disclosed herein. In some examples, aspects of the operations of 1505 may be performed by a scheduling component 1025 as described with reference to FIG. 10.

At 1510, the method may include communicating with the first wireless device via one or more sidelink channels based on configuring the communication beam using the beam configuration over the set of resources. The operations of 1510 may be performed in accordance with examples as disclosed herein. In some examples, aspects of the operations of 1510 may be performed by a sidelink communication component 1030 as described with reference to FIG. 10.

Figure 16:
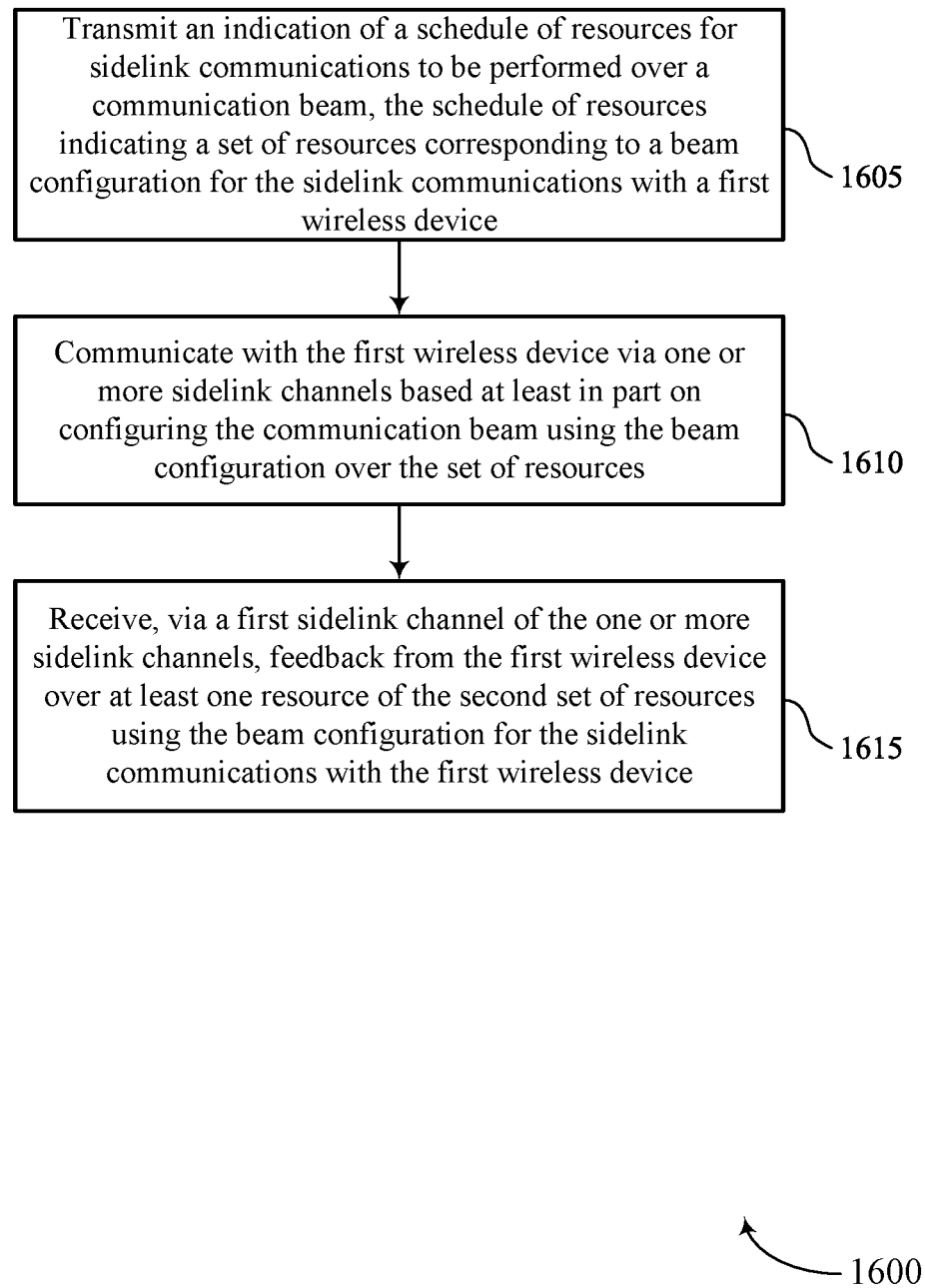

FIG. 16 shows a flowchart illustrating a method 1600 that supports receiving beam scheduling for sidelink communications in accordance with aspects of the present disclosure. The operations of the method 1600 may be implemented by a UE or its components as described herein. For example, the operations of the method 1600 may be performed by a UE 115 (e.g., a second wireless device) as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting an indication of a schedule of resources for sidelink communications to be performed over a communication beam, the schedule of resources indicating a set of resources corresponding to a beam configuration for the sidelink communications with a first wireless device. The operations of 1605 may be performed in accordance with examples as disclosed herein. In some examples, aspects of the operations of 1605 may be performed by a scheduling component 1025 as described with reference to FIG. 10.

At 1610, the method may include communicating with the first wireless device via one or more sidelink channels based on configuring the communication beam using the beam configuration over the set of resources. The operations of 1610 may be performed in accordance with examples as disclosed herein. In some examples, aspects of the operations of 1610 may be performed by a sidelink communication component 1030 as described with reference to FIG. 10.

At 1615, the method may include receiving, via a first sidelink channel of the one or more sidelink channels, feedback from the first wireless device over at least one resource of the second set of resources using the beam configuration for the sidelink communications with the first wireless device. The operations of 1615 may be performed in accordance with examples as disclosed herein. In some examples, aspects of the operations of 1615 may be performed by a feedback component 1035 as described with reference to FIG. 10.

The following provides an overview of aspects of the present disclosure:

Aspect 1: A method for wireless communication at a first wireless device, comprising: receiving an indication of a schedule of resources for sidelink communications to be performed over a communication beam, the schedule of resources indicating a set of resources corresponding to a beam configuration for the sidelink communications with a second wireless device; communicating with the second wireless device via one or more sidelink channels based at least in part on configuring the communication beam using the beam configuration over the set of resources.

Aspect 2: The method of aspect 1, wherein the indication of the schedule of resources is received in a confirmation of the schedule of resources established by the second wireless device.

Aspect 3: The method of any of aspects 1 through 2, wherein the indication of the schedule of resources is received in a request to establish the schedule of resources.

Aspect 4: The method of any of aspects 1 through 3, wherein the schedule of resources comprises a second set of resources corresponding to the beam configuration, wherein communicating with the second wireless device comprises: transmitting, via a first sidelink channel of the one or more sidelink channels, feedback to the second wireless device over at least one resource of the second set of resources using the beam configuration for the sidelink communications with the second wireless device.

Aspect 5: The method of any of aspects 1 through 4, wherein the indication of the schedule of resources is received from a network device.

Aspect 6: The method of any of aspects 1 through 5, further comprising: performing a beamforming alignment procedure with the second wireless device and a third wireless device, wherein the beam configuration is based at least in part on performing the beamforming alignment procedure; and identifying a second set of resources that have been scheduled between the first wireless device and the third wireless device based at least in part on receiving the indication of the schedule of resources, the second set of resources corresponding to a second beam configuration identified during the beamforming alignment procedure.

Aspect 7: The method of any of aspects 1 through 6, further comprising: performing a beamforming alignment procedure with the second wireless device, wherein the beam configuration is based at least in part on performing the beamforming alignment procedure; and identifying a set of beam configurations for communicating with the second wireless device, wherein the schedule of resources comprises a first set of resources corresponding to a first beam configuration of the set of beam configurations and a second set of resources corresponding to a second beam configuration of the set of beam configurations.

Aspect 8: The method of aspect 7, wherein the first set of resources is orthogonal to the second set of resources.

Aspect 9: The method of any of aspects 7 through 8, further comprising: identifying a third set of resources and a fourth set of resources of the schedule of resources; and receiving, from the second wireless device over at least one resource of the first set of resources, an indication to communicate with the second wireless device over at least one resource of the third set of resources using the first beam configuration; and receiving, from the second wireless device over at least one resource of the second set of resources, an indication to communicate with the second wireless device over at least one resource of the fourth set of resources using the second beam configuration.

Aspect 10: The method of aspect 9, wherein the third set of resources and the fourth set of resources at least partially overlap.

Aspect 11: The method of any of aspects 9 through 10, wherein the indication to communicate with the second wireless device over the at least one resource of the third set of resources using the first beam configuration is received using the first beam configuration or the second beam configuration.

Aspect 12: The method of any of aspects 1 through 11, further comprising: identifying a second set of resources of the schedule of resources, the second set of resources associated with a condition for performing the sidelink communications with the second wireless device over the second set of resources, wherein communicating with the second wireless device via the one or more sidelink channels is based at least in part on identifying the second set of resources.

Aspect 13: The method of aspect 12, further comprising: receiving, from the second wireless device over at least one resource of the set of resources, an indication to communicate with the second wireless device over at least one resource of the second set of resources using the beam configuration, wherein communicating with the second wireless device via the one or more sidelink channels is based at least in part on the indication to communicate with the second wireless device.

Aspect 14: The method of aspect 13, wherein the indication to communicate over at least one resource of the second set of resources is received via a second beam configuration associated with a sidelink channel of the one or more sidelink channels.

Aspect 15: The method of any of aspects 13 through 14, wherein receiving the indication to communicate with the second wireless device over the at least one resource of the second set of resources comprises: receiving a request over the at least one resource of the set of resources, wherein the condition comprises receiving the request.

Aspect 16: The method of aspect 15, wherein the request is received via a feedback channel.

Aspect 17: The method of any of aspects 15 through 16, further comprising: transmitting, to the second wireless device, an indication that the second set of resources of the schedule of resources is available for the sidelink communications based at least in part on receiving the indication to communicate with the second wireless device over the at least one resource of the second set of resources; and receiving, from the second wireless device, a second indication to communicate with the second wireless device over the at least one resource of the second set of resources via a feedback channel based at least in part on transmitting the indication.

Aspect 18: The method of aspect 17, wherein a hybrid automatic repeat request response associated with communications between the first wireless device and the second wireless device is received via the feedback channel or is received via a second feedback channel.

Aspect 19: The method of any of aspects 17 through 18, further comprising: receiving a third indication to communicate with a third wireless device over at least one resource of a third set of resources that at least partially overlaps with the second set of resources, wherein the second indication comprises a first priority associated with communications with the second wireless device and the third indication comprises a second priority associated with communications with the third wireless device; communicating with one of the first wireless device or the second wireless device over one of a resource of the second set of resources or a resource of the third set of resources using a corresponding beam configuration based at least in part on at least one of the first priority or the second priority.

Aspect 20: The method of any of aspects 12 through 19, further comprising: transmitting, to the second wireless device, an indication that the second set of resources of the schedule of resources is available for the sidelink communications, wherein communicating with the second wireless device via the one or more sidelink channels is based at least in part on the availability of the second set of resources of the schedule of resources.

Aspect 21: The method of aspect 20, wherein transmitting the indication that the second set of resources of the schedule of resources is available comprises: transmitting the indication via a sidelink feedback channel of the one or more sidelink channels.

Aspect 22: The method of any of aspects 1 through 21, wherein identifying the set of resources of the schedule of resources is based at least in part on a traffic volume associated with the sidelink communications between the first wireless device and the second wireless device.

Aspect 23: The method of any of aspects 1 through 22, further comprising: identifying a second set of resources of the schedule of resources, the second set of resources corresponding to a second beam configuration for the sidelink communications with a third wireless device, wherein identifying the second set of resources is based at least in part on receiving the indication of the schedule of resources; and communicating the sidelink communications with the third wireless device via the one or more sidelink channels based at least in part on configuring the communication beam using the second beam configuration over the second set of resources.

Aspect 24: The method of aspect 23, further comprising: identifying a third set of resources of the schedule of resources based at least in part on receiving the indication of the schedule of resources, the third set of resources corresponding to a third beam configuration associated with communications at the first wireless device according to a threshold, wherein communicating with the second wireless device is based at least at in part identifying the third set of resources.

Aspect 25: A method for wireless communication at a second wireless device, comprising: transmitting an indication of a schedule of resources for sidelink communications to be performed over a communication beam, the schedule of resources indicating a set of resources corresponding to a beam configuration for the sidelink communications with a first wireless device; communicating with the first wireless device via one or more sidelink channels based at least in part on configuring the communication beam using the beam configuration over the set of resources.

Aspect 26: The method of aspect 25, wherein the indication of the schedule of resources is transmitted in a confirmation of the schedule of resources established by the second wireless device.

Aspect 27: The method of any of aspects 25 through 26, wherein the indication of the schedule of resources is transmitted in a request to establish the schedule of resources.

Aspect 28: The method of any of aspects 25 through 27, wherein the schedule of resources comprises a second set of resources corresponding to the beam configuration, wherein communicating with the first wireless device comprises: receiving, via a first sidelink channel of the one or more sidelink channels, feedback from the first wireless device over at least one resource of the second set of resources using the beam configuration for the sidelink communications with the first wireless device.

Aspect 29: An apparatus for wireless communication at a first wireless device, comprising a processor; memory coupled with the processor; and instructions stored in the memory and executable by the processor to cause the apparatus to perform a method of any of aspects 1 through 24.

Aspect 30: An apparatus for wireless communication at a first wireless device, comprising at least one means for performing a method of any of aspects 1 through 24.

Aspect 31: A non-transitory computer-readable medium storing code for wireless communication at a first wireless device, the code comprising instructions executable by a processor to perform a method of any of aspects 1 through 24.

Aspect 32: An apparatus for wireless communication at a second wireless device, comprising a processor; memory coupled with the processor; and instructions stored in the memory and executable by the processor to cause the apparatus to perform a method of any of aspects 25 through 28.

Aspect 33: An apparatus for wireless communication at a second wireless device, comprising at least one means for performing a method of any of aspects 25 through 28.

Aspect 34: A non-transitory computer-readable medium storing code for wireless communication at a second wireless device, the code comprising instructions executable by a processor to perform a method of any of aspects 25 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., any combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
   one or more processors;
   memory coupled with the one or more processors; and
   instructions stored in the memory and executable by the one or more processors to cause the apparatus to:
      receive an indication of a schedule of resources for sidelink communications to be performed over a communication beam, the schedule of resources indicating a first set of resources corresponding to a first beam configuration for the sidelink communications with a second wireless device and indicating a second set of resources corresponding to a second beam configuration for the sidelink communications with the second wireless device or a third wireless device; and
      communicate with the second wireless device or the third wireless device, or both, via one or more sidelink channels based at least in part on configuring, according to the schedule of resources, the communication beam using the first beam configuration over the first set of resources and using the second beam configuration over the second set of resources.

2. The apparatus of claim 1, wherein the indication of the schedule of resources is received in a confirmation of the schedule of resources established by the second wireless device.

3. The apparatus of claim 1, wherein the indication of the schedule of resources is received in a request to establish the schedule of resources.

4. The apparatus of claim 1, wherein the schedule of resources indicates a third set of resources corresponding to the first beam configuration, wherein the instructions to communicate with the second wireless device or the third wireless device, or both are executable by the one or more processors to cause the apparatus to:
   transmit, via a first sidelink channel of the one or more sidelink channels, feedback to the second wireless device over at least one resource of the third set of resources using the first beam configuration for the sidelink communications with the second wireless device.

5. The apparatus of claim 1, wherein the indication of the schedule of resources is received from a network device.

6. The apparatus of claim 1, wherein the instructions are further executable by the one or more processors to cause the apparatus to:
perform a beamforming alignment procedure with the second wireless device and the third wireless device, wherein the first beam configuration and the second beam configuration are based at least in part on performing the beamforming alignment procedure; and
identify the second set of resources that have been scheduled between the first wireless device and the third wireless device based at least in part on receiving the indication of the schedule of resources, the second set of resources corresponding to the second beam configuration identified during the beamforming alignment procedure.

7. The apparatus of claim 1, wherein the instructions are further executable by the one or more processors to cause the apparatus to:
perform a beamforming alignment procedure with the second wireless device, wherein the first beam configuration and the second beam configuration are based at least in part on performing the beamforming alignment procedure; and
identify a set of beam configurations for communicating with the second wireless device, wherein the schedule of resources comprises the first set of resources corresponding to the first beam configuration of the set of beam configurations and a third set of resources corresponding to a third beam configuration of the set of beam configurations.

8. The apparatus of claim 7, wherein the first set of resources is orthogonal to the third set of resources.

9. The apparatus of claim 7, wherein the instructions are further executable by the one or more processors to cause the apparatus to:
identify a fourth set of resources and a fifth set of resources of the schedule of resources;
receive, from the second wireless device over at least one resource of the third set of resources, an indication to communicate with the second wireless device over at least one resource of the fourth set of resources using the first beam configuration; and
receive, from the second wireless device over the at least one resource of the second set of resources, an indication to communicate with the second wireless device over at least one resource of the fifth set of resources using the third beam configuration.

10. The apparatus of claim 9, wherein:
the fourth set of resources and the fifth set of resources at least partially overlap.

11. The apparatus of claim 9, wherein the indication to communicate with the second wireless device over the at least one resource of the fourth set of resources using the first beam configuration is received using the first beam configuration or the third beam configuration.

12. The apparatus of claim 1, wherein the instructions are further executable by the one or more processors to cause the apparatus to:
identify a third set of resources of the schedule of resources, the third set of resources associated with a condition for performing the sidelink communications with the second wireless device over the third set of resources, wherein communicating with the second wireless device via the one or more sidelink channels is based at least in part on identifying the third set of resources.

13. The apparatus of claim 12, wherein the instructions are further executable by the one or more processors to cause the apparatus to:
receive, from the second wireless device over at least one resource of the first set of resources, an indication to communicate with the second wireless device over at least one resource of the third set of resources using the first beam configuration, wherein communicating with the second wireless device via the one or more sidelink channels is based at least in part on the indication to communicate with the second wireless device.

14. The apparatus of claim 13, wherein the indication to communicate over the at least one resource of the third set of resources is received via a third beam configuration associated with a sidelink channel of the one or more sidelink channels.

15. The apparatus of claim 13, wherein the instructions to receive the indication to communicate with the second wireless device over the at least one resource of the third set of resources are executable by the one or more processors to cause the apparatus to:
receive a request over the at least one resource of the first set of resources, wherein the condition comprises receiving the request.

16. The apparatus of claim 15, wherein the request is received via a feedback channel.

17. The apparatus of claim 15, wherein the instructions are further executable by the one or more processors to cause the apparatus to:
transmit, to the second wireless device, an indication that the third set of resources of the schedule of resources is available for the sidelink communications based at least in part on receiving the indication to communicate with the second wireless device over the at least one resource of the third set of resources; and
receive, from the second wireless device, a second indication to communicate with the second wireless device over the at least one resource of the third set of resources via a feedback channel based at least in part on transmitting the indication.

18. The apparatus of claim 17, wherein a hybrid automatic repeat request response associated with communications between the first wireless device and the second wireless device is received via the feedback channel or is received via a second feedback channel.

19. The apparatus of claim 17, wherein the instructions are further executable by the one or more processors to cause the apparatus to:
receive a third indication to communicate with the third wireless device over at least one resource of a fourth set of resources that at least partially overlaps with the third set of resources, wherein the second indication comprises a first priority associated with communications with the second wireless device and the third indication comprises a second priority associated with communications with the third wireless device; and
communicate with one of the third wireless device or the second wireless device over one of a resource of the third set of resources or a resource of the fourth set of resources using a corresponding beam configuration based at least in part on at least one of the first priority or the second priority.

20. The apparatus of claim 12, wherein the instructions are further executable by the one or more processors to cause the apparatus to:

transmit, to the second wireless device, an indication that the third set of resources of the schedule of resources is available for the sidelink communications, wherein communicating with the second wireless device via the one or more sidelink channels is based at least in part on the availability of the third set of resources of the schedule of resources.

21. The apparatus of claim 20, wherein the instructions to transmit the indication that the third set of resources of the schedule of resources is available are executable by the one or more processors to cause the apparatus to:

transmit the indication via a sidelink feedback channel of the one or more sidelink channels.

22. The apparatus of claim 1, wherein the first set of resources of the schedule of resources is based at least in part on a traffic volume associated with the sidelink communications between the first wireless device and the second wireless device.

23. The apparatus of claim 1, wherein the instructions are further executable by the one or more processors to cause the apparatus to:

identify the second set of resources of the schedule of resources, the second beam configuration for the sidelink communications with the third wireless device, wherein identifying the second set of resources is based at least in part on receiving the indication of the schedule of resources; and communicate the sidelink communications with the third wireless device via the one or more sidelink channels based at least in part on configuring the communication beam using the second beam configuration over the second set of resources.

24. The apparatus of claim 23, wherein the instructions are further executable by the one or more processors to cause the apparatus to:

identify a third set of resources of the schedule of resources based at least in part on receiving the indication of the schedule of resources, the third set of resources corresponding to a third beam configuration associated with communications at the first wireless device according to a threshold, wherein communicating with the second wireless device is based at least at in part identifying the third set of resources.

25. An apparatus for wireless communication at a second wireless device, comprising:

one or more processors;
memory coupled with the one or more processors; and
instructions stored in the memory and executable by the one or more processors to cause the apparatus to:
transmit an indication of a schedule of resources for sidelink communications to be performed over a communication beam, the schedule of resources indicating a first set of resources corresponding to a first beam configuration for the sidelink communications with a first wireless device and indicating a second set of resources corresponding to a second beam configuration for the sidelink communications with the first wireless device or a third wireless device; and communicate with the first wireless device or the third wireless device, or both, via one or more sidelink channels based at least in part on configuring, according to the schedule of resources, the communication beam using the first beam configuration over the first set of resources and using the second beam configuration over the second set of resources.

26. The apparatus of claim 25, wherein the indication of the schedule of resources is transmitted in a confirmation of the schedule of resources established by the second wireless device.

27. The apparatus of claim 25, wherein the indication of the schedule of resources is transmitted in a request to establish the schedule of resources.

28. The apparatus of claim 25, wherein the schedule of resources comprises a third set of resources corresponding to the first beam configuration, wherein the instructions to communicate with the first wireless device or the third wireless device, or both are executable by the one or more processors to cause the apparatus to:

receive, via a first sidelink channel of the one or more sidelink channels, feedback from the first wireless device over at least one resource of the third set of resources using the first beam configuration for the sidelink communications with the first wireless device.

29. A method for wireless communication at a first wireless device, comprising:

receiving an indication of a schedule of resources for sidelink communications to be performed over a communication beam, the schedule of resources indicating a first set of resources corresponding to a first beam configuration for the sidelink communications with a second wireless device and indicating a second set of resources corresponding to a second beam configuration for the sidelink communications with the second wireless device or a third wireless device; and communicating with the second wireless device or the third wireless device, or both, via one or more sidelink channels based at least in part on configuring, according to the schedule of resources, the communication beam using the first beam configuration over the first set of resources and using the second beam configuration over the second set of resources.

30. A method for wireless communication at a second wireless device, comprising:

transmitting an indication of a schedule of resources for sidelink communications to be performed over a communication beam, the schedule of resources indicating a first set of resources corresponding to a first beam configuration for the sidelink communications with a first wireless device and indicating a second set of resources corresponding to a second beam configuration for the sidelink communications with the first wireless device or a third wireless device; and communicating with the first wireless device or the third wireless device, or both, via one or more sidelink channels based at least in part on configuring, according to the schedule of resources, the communication beam using the first beam configuration over the first set of resources and using the second beam configuration over the second set of resources.

* * * * *